(12) United States Patent
Rajan et al.

(10) Patent No.: US 8,335,894 B1
(45) Date of Patent: Dec. 18, 2012

(54) CONFIGURABLE MEMORY SYSTEM WITH INTERFACE CIRCUIT

(75) Inventors: Suresh Natarajan Rajan, San Jose, CA (US); David T. Wang, San Jose, CA (US)

(73) Assignee: Google Inc., Mountian View, CA (US)

( * ) Notice: Subject to any disclaimer, the term of this patent is extended or adjusted under 35 U.S.C. 154(b) by 293 days.

(21) Appl. No.: 12/508,496

(22) Filed: Jul. 23, 2009

Related U.S. Application Data

(60) Provisional application No. 61/083,878, filed on Jul. 25, 2008.

(51) Int. Cl.
  *G06F 12/00* (2006.01)
(52) U.S. Cl. .......................... 711/154; 711/167
(58) Field of Classification Search .................. 711/103, 711/154
  See application file for complete search history.

(56) References Cited

U.S. PATENT DOCUMENTS

| | | |
|---|---|---|
| 3,800,292 A | 3/1974 | Curley et al. |
| 4,069,452 A | 1/1978 | Conway et al. |
| 4,323,965 A | 4/1982 | Johnson et al. |
| 4,334,307 A | 6/1982 | Bourgeois et al. |
| 4,345,319 A | 8/1982 | Bernardini et al. |
| 4,392,212 A | 7/1983 | Miyasaka et al. ............. 365/230 |
| 4,525,921 A | 7/1985 | Carson et al. .................... 29/577 |
| 4,566,082 A | 1/1986 | Anderson |
| 4,592,019 A | 5/1986 | Huang et al. .................... 365/78 |
| 4,646,128 A | 2/1987 | Carson et al. ................... 357/74 |
| 4,698,748 A | 10/1987 | Juzswik et al. ............... 364/200 |
| 4,706,166 A | 11/1987 | Go ............................. 361/403 |
| 4,710,903 A | 12/1987 | Hereth et al. ................. 365/194 |
| 4,764,846 A | 8/1988 | Go ............................. 361/388 |
| 4,780,843 A | 10/1988 | Tietjen ......................... 364/900 |
| 4,794,597 A | 12/1988 | Ooba et al. |
| 4,796,232 A | 1/1989 | House .......................... 365/189 |
| 4,807,191 A | 2/1989 | Flannagan |
| 4,841,440 A | 6/1989 | Yonezu et al. ................ 364/200 |
| 4,862,347 A | 8/1989 | Rudy |
| 4,884,237 A | 11/1989 | Mueller et al. .................. 365/63 |
| 4,887,240 A | 12/1989 | Garverick et al. ............ 361/222 |
| 4,888,687 A | 12/1989 | Allison et al. |
| 4,899,107 A | 2/1990 | Corbett et al. ............... 324/158 |
| 4,912,678 A | 3/1990 | Mashiko |
| 4,922,451 A | 5/1990 | Lo et al. |
| 4,935,734 A | 6/1990 | Austin ......................... 340/825 |
| 4,937,791 A | 6/1990 | Steele et al. |

(Continued)

FOREIGN PATENT DOCUMENTS

DE  102004051345  5/2006

(Continued)

OTHER PUBLICATIONS

Search Report From PCT Application No. PCT/US10/038041 Dated Aug. 23, 2010.

(Continued)

*Primary Examiner* — Reba I Elmore
(74) *Attorney, Agent, or Firm* — Fish & Richardson P.C.

(57) ABSTRACT

An interface circuit that emulates a memory circuit having a first organization using a memory circuit having a second organization, wherein the second organization includes a number of banks, a number of rows, a number of columns, and a number of bits per column.

24 Claims, 15 Drawing Sheets

U.S. PATENT DOCUMENTS

| | | | |
|---|---|---|---|
| 4,956,694 A | 9/1990 | Eide | 357/74 |
| 4,982,265 A | 1/1991 | Watanabe et al. | 357/75 |
| 4,983,533 A | 1/1991 | Go | 437/7 |
| 5,025,364 A | 6/1991 | Zellmer | |
| 5,072,424 A | 12/1991 | Brent et al. | 365/189 |
| 5,083,266 A | 1/1992 | Watanabe | 395/275 |
| 5,104,820 A | 4/1992 | Go et al. | 437/51 |
| 5,193,072 A | 3/1993 | Frenkil et al. | |
| 5,212,666 A | 5/1993 | Takeda | |
| 5,220,672 A | 6/1993 | Nakao et al. | 395/750 |
| 5,241,266 A | 8/1993 | Ahmad et al. | 324/158 |
| 5,252,807 A | 10/1993 | Chizinsky | |
| 5,257,233 A | 10/1993 | Schaefer | 365/227 |
| 5,278,796 A | 1/1994 | Tillinghast et al. | 365/211 |
| 5,282,177 A | 1/1994 | McLaury | 365/230 |
| 5,332,922 A | 7/1994 | Oguchi et al. | 257/723 |
| 5,347,428 A | 9/1994 | Carson et al. | 361/760 |
| 5,369,749 A | 11/1994 | Baker et al. | |
| 5,384,745 A | 1/1995 | Konishi et al. | 365/230 |
| 5,388,265 A | 2/1995 | Volk | 395/750 |
| 5,390,334 A | 2/1995 | Harrison | |
| 5,408,190 A | 4/1995 | Wood et al. | 324/765 |
| 5,432,729 A | 7/1995 | Carson et al. | 365/63 |
| 5,448,511 A | 9/1995 | Paurus et al. | 365/52 |
| 5,453,434 A | 9/1995 | Delp et al. | 714/718 |
| 5,467,455 A | 11/1995 | Gay et al. | 395/281 |
| 5,483,497 A | 1/1996 | Mochizuki et al. | |
| 5,498,886 A | 3/1996 | Hsu et al. | 257/213 |
| 5,502,333 A | 3/1996 | Bertin et al. | |
| 5,502,667 A | 3/1996 | Bertin et al. | 365/51 |
| 5,513,135 A | 4/1996 | Dell et al. | |
| 5,513,339 A | 4/1996 | Agrawal et al. | |
| 5,519,832 A | 5/1996 | Warchol | |
| 5,526,320 A | 6/1996 | Zagar et al. | 365/233 |
| 5,530,836 A | 6/1996 | Busch et al. | 395/477 |
| 5,550,781 A | 8/1996 | Sugawara et al. | |
| 5,559,990 A | 9/1996 | Cheng et al. | 395/484 |
| 5,561,622 A | 10/1996 | Bertin et al. | 365/51 |
| 5,563,086 A | 10/1996 | Bertin et al. | 437/52 |
| 5,566,344 A | 10/1996 | Hall et al. | 395/800 |
| 5,581,498 A | 12/1996 | Ludwig et al. | 365/63 |
| 5,581,779 A | 12/1996 | Hall et al. | 395/800 |
| 5,590,071 A | 12/1996 | Kolor et al. | 365/149 |
| 5,598,376 A | 1/1997 | Merritt et al. | 365/230 |
| 5,604,714 A | 2/1997 | Manning et al. | 365/230 |
| 5,606,710 A | 2/1997 | Hall et al. | 395/800 |
| 5,608,262 A | 3/1997 | Degani et al. | 257/723 |
| 5,610,864 A | 3/1997 | Manning | 365/193 |
| 5,623,686 A | 4/1997 | Hall et al. | 395/800 |
| 5,627,791 A | 5/1997 | Wright et al. | 365/222 |
| 5,640,337 A | 6/1997 | Huang et al. | 364/578 |
| 5,640,364 A | 6/1997 | Merritt et al. | 365/233 |
| 5,652,724 A | 7/1997 | Manning | 365/189 |
| 5,654,204 A | 8/1997 | Anderson | 438/15 |
| 5,661,677 A | 8/1997 | Rondeau et al. | 365/63 |
| 5,661,695 A | 8/1997 | Zagar et al. | 365/233 |
| 5,668,773 A | 9/1997 | Zagar et al. | 365/233 |
| 5,675,549 A | 10/1997 | Ong et al. | 365/233 |
| 5,680,342 A | 10/1997 | Frankeny | 365/52 |
| 5,682,354 A | 10/1997 | Manning | 365/233 |
| 5,692,121 A | 11/1997 | Bozso et al. | |
| 5,692,202 A | 11/1997 | Kardach et al. | 395/750 |
| 5,696,732 A | 12/1997 | Zagar et al. | 365/233 |
| 5,702,984 A | 12/1997 | Bertin et al. | 437/208 |
| 5,703,813 A | 12/1997 | Manning et al. | 365/189 |
| 5,706,247 A | 1/1998 | Merritt et al. | 365/233 |
| RE35,733 E | 2/1998 | Hernandez et al. | |
| 5,717,654 A | 2/1998 | Manning | 365/233 |
| 5,721,859 A | 2/1998 | Manning | 397/421 |
| 5,724,288 A | 3/1998 | Cloud et al. | 365/193 |
| 5,729,503 A | 3/1998 | Manning | 365/233 |
| 5,729,504 A | 3/1998 | Cowles | 365/236 |
| 5,742,792 A | 4/1998 | Yanai et al. | |
| 5,748,914 A | 5/1998 | Barth et al. | 395/285 |
| 5,752,045 A | 5/1998 | Chen | 395/750 |
| 5,757,703 A | 5/1998 | Merritt et al. | 365/189 |
| 5,761,703 A | 6/1998 | Bolyn | 711/106 |
| 5,781,766 A | 7/1998 | Davis | 395/552 |
| 5,787,457 A | 7/1998 | Miller et al. | |
| 5,798,961 A | 8/1998 | Heyden et al. | 365/52 |
| 5,802,010 A | 9/1998 | Zagar et al. | 365/233 |
| 5,802,395 A | 9/1998 | Connolly et al. | |
| 5,802,555 A | 9/1998 | Shigeeda | 711/106 |
| 5,812,488 A | 9/1998 | Zagar et al. | 365/233 |
| 5,818,788 A | 10/1998 | Kimura et al. | |
| 5,819,065 A | 10/1998 | Chilton et al. | |
| 5,831,833 A | 11/1998 | Shirakawa et al. | |
| 5,831,931 A | 11/1998 | Manning | 365/233 |
| 5,831,932 A | 11/1998 | Merritt et al. | 365/233 |
| 5,834,838 A | 11/1998 | Anderson | 257/697 |
| 5,835,435 A | 11/1998 | Bogin et al. | 365/227 |
| 5,838,165 A | 11/1998 | Chatter | 326/38 |
| 5,838,177 A | 11/1998 | Keeth | 327/108 |
| 5,841,580 A | 11/1998 | Farmwald et al. | 365/194 |
| 5,843,799 A | 12/1998 | Hsu et al. | 438/6 |
| 5,843,807 A | 12/1998 | Burns | 438/109 |
| 5,845,108 A | 12/1998 | Yoo et al. | 395/551 |
| 5,850,368 A | 12/1998 | Ong et al. | 365/238 |
| 5,859,792 A | 1/1999 | Rondeau et al. | 365/52 |
| 5,860,106 A | 1/1999 | Domen et al. | 711/137 |
| 5,870,347 A | 2/1999 | Keeth et al. | 365/230 |
| 5,870,350 A | 2/1999 | Bertin et al. | |
| 5,872,907 A | 2/1999 | Griess et al. | |
| 5,875,142 A | 2/1999 | Chevallier | 365/212 |
| 5,878,279 A | 3/1999 | Athenes | |
| 5,884,088 A | 3/1999 | Kardach et al. | 395/750 |
| 5,901,105 A | 5/1999 | Ong et al. | 365/230 |
| 5,903,500 A | 5/1999 | Tsang et al. | 365/189 |
| 5,905,688 A | 5/1999 | Park | 365/227 |
| 5,907,512 A | 5/1999 | Parkinson et al. | 365/195 |
| 5,913,072 A | 6/1999 | Wierenga | |
| 5,915,105 A | 6/1999 | Farmwald et al. | 395/309 |
| 5,915,167 A | 6/1999 | Leedy | |
| 5,917,758 A | 6/1999 | Keeth | 365/189 |
| 5,923,611 A | 7/1999 | Ryan | 365/233 |
| 5,924,111 A | 7/1999 | Huang et al. | |
| 5,926,435 A | 7/1999 | Park et al. | 365/233 |
| 5,929,650 A | 7/1999 | Pappert et al. | 324/763 |
| 5,943,254 A | 8/1999 | Bakeman, Jr. et al. | 365/72 |
| 5,946,265 A | 8/1999 | Cowles | 365/233 |
| 5,949,254 A | 9/1999 | Keeth | 326/87 |
| 5,953,215 A | 9/1999 | Karabatsos | 361/767 |
| 5,953,263 A | 9/1999 | Farmwald et al. | 365/194 |
| 5,954,804 A | 9/1999 | Farmwald et al. | 710/36 |
| 5,956,233 A | 9/1999 | Yew et al. | 361/760 |
| 5,963,429 A | 10/1999 | Chen | |
| 5,963,463 A | 10/1999 | Rondeau et al. | 365/52 |
| 5,963,464 A | 10/1999 | Dell et al. | 365/52 |
| 5,963,504 A | 10/1999 | Manning | 365/233 |
| 5,966,724 A | 10/1999 | Ryan | 711/105 |
| 5,966,727 A | 10/1999 | Nishino | 711/127 |
| 5,969,996 A | 10/1999 | Muranaka et al. | 365/189 |
| 5,973,392 A | 10/1999 | Senba et al. | 257/686 |
| 5,995,424 A | 11/1999 | Lawrence et al. | |
| 5,995,443 A | 11/1999 | Farmwald et al. | 365/233 |
| 6,001,671 A | 12/1999 | Fjelstad | 438/112 |
| 6,002,613 A | 12/1999 | Cloud et al. | 365/189 |
| 6,002,627 A | 12/1999 | Chevallier | 365/212 |
| 6,014,339 A | 1/2000 | Kobayashi et al. | 365/233 |
| 6,016,282 A | 1/2000 | Keeth | 365/233 |
| 6,026,050 A | 2/2000 | Baker et al. | 365/233 |
| 6,029,250 A | 2/2000 | Keeth | 713/400 |
| 6,032,214 A | 2/2000 | Farmwald et al. | 710/129 |
| 6,032,215 A | 2/2000 | Farmwald et al. | 710/129 |
| 6,034,916 A | 3/2000 | Lee | 365/233 |
| 6,034,918 A | 3/2000 | Farmwald et al. | 365/233 |
| 6,035,365 A | 3/2000 | Farmwald et al. | 710/129 |
| 6,038,195 A | 3/2000 | Farmwald et al. | 365/233 |
| 6,038,673 A | 3/2000 | Benn et al. | 713/323 |
| 6,044,032 A | 3/2000 | Li | 365/230 |
| 6,047,073 A | 4/2000 | Norris et al. | |
| 6,047,344 A | 4/2000 | Kawasumi et al. | 710/107 |
| 6,053,948 A | 4/2000 | Vaidyanathan et al. | 703/14 |
| 6,058,451 A | 5/2000 | Bermingham et al. | |
| 6,065,092 A | 5/2000 | Roy | |
| 6,069,504 A | 5/2000 | Keeth | 327/108 |
| 6,070,217 A | 5/2000 | Connolly et al. | 710/131 |

| Patent No. | Date | Inventor | Class |
|---|---|---|---|
| 6,073,223 A | 6/2000 | McAllister et al. | 711/167 |
| 6,075,730 A | 6/2000 | Barth et al. | 365/191 |
| 6,075,744 A | 6/2000 | Tsern et al. | 365/230 |
| 6,078,546 A | 6/2000 | Lee | 365/233 |
| 6,079,025 A | 6/2000 | Fung | 713/323 |
| 6,084,434 A | 7/2000 | Keeth | 326/87 |
| 6,088,290 A | 7/2000 | Ohtake et al. | 365/233 |
| 6,091,251 A | 7/2000 | Wood et al. | 324/755 |
| RE36,839 E | 8/2000 | Simmons et al. | 326/93 |
| 6,101,152 A | 8/2000 | Farmwald et al. | 365/233 |
| 6,101,564 A | 8/2000 | Athenes et al. | |
| 6,101,612 A | 8/2000 | Jeddeloh | 713/401 |
| 6,108,795 A | 8/2000 | Jeddeloh | 713/401 |
| 6,111,812 A | 8/2000 | Gans et al. | 365/233 |
| 6,125,072 A | 9/2000 | Wu | |
| 6,134,638 A | 10/2000 | Olarig et al. | 711/167 |
| 6,154,370 A | 11/2000 | Degani et al. | 361/761 |
| 6,166,991 A | 12/2000 | Phelan | 365/233 |
| 6,181,640 B1 | 1/2001 | Kang | |
| 6,182,184 B1 | 1/2001 | Farmwald et al. | 710/129 |
| 6,199,151 B1 | 3/2001 | Williams et al. | |
| 6,208,168 B1 | 3/2001 | Rhee | 326/83 |
| 6,216,246 B1 | 4/2001 | Shau | 714/763 |
| 6,222,739 B1 | 4/2001 | Bhakta et al. | 361/790 |
| 6,226,709 B1 | 5/2001 | Goodwin et al. | |
| 6,226,730 B1 | 5/2001 | Murdoch et al. | |
| 6,233,192 B1 | 5/2001 | Tanaka | 365/222 |
| 6,233,650 B1 | 5/2001 | Johnson et al. | |
| 6,240,048 B1 | 5/2001 | Matsubara | 365/233 |
| 6,243,282 B1 | 6/2001 | Rondeau et al. | 365/52 |
| 6,252,807 B1 | 6/2001 | Suzuki et al. | 365/193 |
| 6,260,097 B1 | 7/2001 | Farmwald et al. | 710/129 |
| 6,260,154 B1 | 7/2001 | Jeddeloh | 713/401 |
| 6,262,938 B1 | 7/2001 | Lee et al. | 365/233 |
| 6,266,285 B1 | 7/2001 | Farmwald et al. | 365/194 |
| 6,266,292 B1 | 7/2001 | Tsern et al. | 365/230 |
| 6,274,395 B1 | 8/2001 | Weber | 438/14 |
| 6,279,069 B1 | 8/2001 | Robinson et al. | 711/103 |
| 6,295,572 B1 | 9/2001 | Wu | 710/131 |
| 6,298,426 B1 | 10/2001 | Ajanovic | 711/172 |
| 6,304,511 B1 | 10/2001 | Gans et al. | 365/233 |
| 6,307,769 B1 | 10/2001 | Nuxoll et al. | 365/63 |
| 6,314,051 B1 | 11/2001 | Farmwald et al. | 365/233 |
| 6,317,352 B1 | 11/2001 | Halbert et al. | 365/52 |
| 6,317,381 B1 | 11/2001 | Gans et al. | 365/233 |
| 6,324,120 B2 | 11/2001 | Farmwald et al. | 365/233 |
| 6,326,810 B1 | 12/2001 | Keeth | 326/83 |
| 6,327,664 B1 | 12/2001 | Dell et al. | 713/323 |
| 6,330,683 B1 | 12/2001 | Jeddeloh | 713/401 |
| 6,336,174 B1 | 1/2002 | Li et al. | |
| 6,338,108 B1 | 1/2002 | Motomura | 710/110 |
| 6,338,113 B1 | 1/2002 | Kubo et al. | 711/105 |
| 6,341,347 B1 | 1/2002 | Joy et al. | 712/228 |
| 6,343,042 B1 | 1/2002 | Tsern et al. | 365/222 |
| 6,353,561 B1 | 3/2002 | Funyu et al. | 365/195 |
| 6,356,105 B1 | 3/2002 | Volk | 326/30 |
| 6,356,500 B1 | 3/2002 | Cloud et al. | 365/226 |
| 6,362,656 B2 | 3/2002 | Rhee | 326/87 |
| 6,363,031 B2 | 3/2002 | Phelan | 365/233 |
| 6,378,020 B2 | 4/2002 | Farmwald et al. | 710/129 |
| 6,381,188 B1 | 4/2002 | Choi et al. | 365/222 |
| 6,381,668 B1 | 4/2002 | Lunteren | 711/5 |
| 6,389,514 B1 | 5/2002 | Rokicki | |
| 6,392,304 B1 | 5/2002 | Butler | 257/777 |
| 6,414,868 B1 | 7/2002 | Wong et al. | 365/51 |
| 6,418,034 B1 | 7/2002 | Weber et al. | 361/790 |
| 6,421,754 B1 | 7/2002 | Kau et al. | |
| 6,424,532 B2 | 7/2002 | Kawamura | |
| 6,426,916 B2 | 7/2002 | Farmwald et al. | 365/233 |
| 6,429,029 B1 | 8/2002 | Eldridge et al. | 438/14 |
| 6,430,103 B2 | 8/2002 | Nakayama et al. | 365/230 |
| 6,437,600 B1 | 8/2002 | Keeth | 326/86 |
| 6,438,057 B1 | 8/2002 | Ruckerbauer | 365/222 |
| 6,442,698 B2 | 8/2002 | Nizar | 713/320 |
| 6,445,591 B1 | 9/2002 | Kwong | |
| 6,452,826 B1 | 9/2002 | Kim et al. | 365/51 |
| 6,452,863 B2 | 9/2002 | Farmwald et al. | 365/233 |
| 6,453,400 B1 | 9/2002 | Maesako et al. | 711/167 |
| 6,453,402 B1 | 9/2002 | Jeddeloh | 711/167 |
| 6,453,434 B2 | 9/2002 | Delp et al. | |
| 6,455,348 B1 | 9/2002 | Yamaguchi | |
| 6,457,095 B1 | 9/2002 | Volk | 711/105 |
| 6,459,651 B1 | 10/2002 | Lee et al. | 365/233 |
| 6,473,831 B1 | 10/2002 | Schade | 711/115 |
| 6,476,476 B1 | 11/2002 | Glenn | |
| 6,480,929 B1 | 11/2002 | Gauthier et al. | 711/105 |
| 6,487,102 B1 | 11/2002 | Halbert et al. | 365/51 |
| 6,489,669 B2 | 12/2002 | Shimada et al. | 257/686 |
| 6,490,161 B1 | 12/2002 | Johnson | |
| 6,492,726 B1 | 12/2002 | Quek et al. | |
| 6,493,789 B2 | 12/2002 | Ware et al. | 711/105 |
| 6,496,440 B2 | 12/2002 | Manning | 365/230 |
| 6,496,897 B2 | 12/2002 | Ware et al. | 711/105 |
| 6,498,766 B2 | 12/2002 | Lee et al. | 365/233 |
| 6,510,097 B2 | 1/2003 | Fukuyama | 365/230 |
| 6,510,503 B2 | 1/2003 | Gillingham et al. | 711/167 |
| 6,512,392 B2 | 1/2003 | Fleury et al. | 324/765 |
| 6,521,984 B2 | 2/2003 | Matsuura | 257/768 |
| 6,526,471 B1 | 2/2003 | Shimomura et al. | 711/5 |
| 6,526,473 B1 | 2/2003 | Kim | |
| 6,526,484 B1 | 2/2003 | Stacovsky et al. | 711/158 |
| 6,545,895 B1 | 4/2003 | Li et al. | 365/52 |
| 6,546,446 B2 | 4/2003 | Farmwald et al. | 710/305 |
| 6,553,450 B1 | 4/2003 | Dodd et al. | 711/105 |
| 6,560,158 B2 | 5/2003 | Choi et al. | 365/226 |
| 6,563,337 B2 | 5/2003 | Dour | 326/30 |
| 6,563,759 B2 | 5/2003 | Yahata et al. | 365/233 |
| 6,564,281 B2 | 5/2003 | Farmwald et al. | 710/305 |
| 6,564,285 B1 | 5/2003 | Mills et al. | 711/103 |
| 6,574,150 B2 | 6/2003 | Suyama et al. | 365/189 |
| 6,584,037 B2 | 6/2003 | Farmwald et al. | 365/233 |
| 6,587,912 B2 | 7/2003 | Leddige et al. | 711/5 |
| 6,590,822 B2 | 7/2003 | Hwang et al. | 365/222 |
| 6,594,770 B1 | 7/2003 | Sato et al. | 713/320 |
| 6,597,616 B2 | 7/2003 | Tsern et al. | 365/222 |
| 6,597,617 B2 | 7/2003 | Ooishi et al. | 365/222 |
| 6,614,700 B2 | 9/2003 | Dietrich et al. | 365/194 |
| 6,618,267 B1 | 9/2003 | Dalal et al. | |
| 6,618,791 B1 | 9/2003 | Dodd et al. | 711/105 |
| 6,621,760 B1 | 9/2003 | Ahmad et al. | 365/233 |
| 6,630,729 B2 | 10/2003 | Huang | 257/676 |
| 6,631,086 B1 | 10/2003 | Bill et al. | 365/185 |
| 6,639,820 B1 | 10/2003 | Khandekar et al. | 365/63 |
| 6,646,939 B2 | 11/2003 | Kwak | 365/219 |
| 6,650,588 B2 | 11/2003 | Yamagata | 365/222 |
| 6,650,594 B1 | 11/2003 | Lee et al. | 365/233 |
| 6,657,634 B1 | 12/2003 | Sinclair et al. | 345/534 |
| 6,657,918 B2 | 12/2003 | Foss et al. | 365/233 |
| 6,657,919 B2 | 12/2003 | Foss et al. | 365/233 |
| 6,658,016 B1 | 12/2003 | Dai et al. | |
| 6,658,530 B1 | 12/2003 | Robertson et al. | 711/115 |
| 6,659,512 B1 | 12/2003 | Harper et al. | |
| 6,664,625 B2 | 12/2003 | Hiruma | |
| 6,665,224 B1 | 12/2003 | Lehmann et al. | 365/222 |
| 6,665,227 B2 | 12/2003 | Fetzer | 365/229 |
| 6,668,242 B1 | 12/2003 | Reynov et al. | 703/28 |
| 6,674,154 B2 | 1/2004 | Minamio et al. | |
| 6,683,372 B1 | 1/2004 | Wong et al. | 257/686 |
| 6,684,292 B2 | 1/2004 | Piccirillo et al. | |
| 6,690,191 B2 | 2/2004 | Wu et al. | |
| 6,697,295 B2 | 2/2004 | Farmwald et al. | 365/233 |
| 6,701,446 B2 | 3/2004 | Tsern et al. | 713/501 |
| 6,705,877 B1 | 3/2004 | Li et al. | 439/74 |
| 6,708,144 B1 | 3/2004 | Merryman et al. | 703/14 |
| 6,710,430 B2 | 3/2004 | Minamio et al. | |
| 6,711,043 B2 | 3/2004 | Friedman et al. | |
| 6,713,856 B2 | 3/2004 | Tsai et al. | |
| 6,714,891 B2 | 3/2004 | Dendinger et al. | 702/132 |
| 6,724,684 B2 | 4/2004 | Kim | 365/233 |
| 6,730,540 B2 | 5/2004 | Siniaguine | |
| 6,731,009 B1 | 5/2004 | Jones et al. | |
| 6,731,527 B2 | 5/2004 | Brown | 365/63 |
| 6,742,098 B1 | 5/2004 | Halbert et al. | |
| 6,744,687 B2 | 6/2004 | Koo et al. | 365/226 |
| 6,747,887 B2 | 6/2004 | Halbert et al. | 365/51 |
| 6,751,113 B2 | 6/2004 | Bhakta et al. | 365/63 |
| 6,751,696 B2 | 6/2004 | Farmwald et al. | 710/305 |
| 6,754,129 B2 | 6/2004 | Khatri et al. | 365/226 |

| | | | |
|---|---|---|---|
| 6,754,132 B2 | 6/2004 | Kyung ............................ 365/233 |
| 6,757,751 B1 | 6/2004 | Gene ................................ 710/36 |
| 6,762,948 B2 | 7/2004 | Kyun et al. ....................... 365/51 |
| 6,765,812 B2 | 7/2004 | Anderson ........................ 365/51 |
| 6,766,469 B2 | 7/2004 | Larson et al. |
| 6,771,526 B2 | 8/2004 | LaBerge ........................... 365/63 |
| 6,772,359 B2 | 8/2004 | Kwak et al. ..................... 713/500 |
| 6,779,097 B2 | 8/2004 | Gillingham et al. ............. 711/167 |
| 6,785,767 B2 | 8/2004 | Coulson ........................... 711/112 |
| 6,791,877 B2 | 9/2004 | Miura et al. .................... 365/185 |
| 6,795,899 B2 | 9/2004 | Dodd et al. ..................... 711/137 |
| 6,799,241 B2 | 9/2004 | Kahn et al. ...................... 711/105 |
| 6,801,989 B2 | 10/2004 | Johnson et al. ................. 711/167 |
| 6,807,598 B2 | 10/2004 | Farmwald et al. .............. 710/305 |
| 6,807,655 B1 | 10/2004 | Rehani et al. ..................... 716/4 |
| 6,816,991 B2 | 11/2004 | Sanghani ......................... 714/733 |
| 6,819,602 B2 | 11/2004 | Seo et al. .......................... 365/193 |
| 6,819,617 B2 | 11/2004 | Hwang et al. .................... 365/222 |
| 6,820,163 B1 | 11/2004 | McCall et al. ................... 710/310 |
| 6,820,169 B2 | 11/2004 | Wilcox et al. ................... 711/105 |
| 6,826,104 B2 | 11/2004 | Kawaguchi et al. ............ 365/222 |
| 6,839,290 B2 | 1/2005 | Ahmad et al. ................... 365/193 |
| 6,845,027 B2 | 1/2005 | Mayer et al. ..................... 365/63 |
| 6,845,055 B1 | 1/2005 | Koga et al. ....................... 365/229 |
| 6,847,582 B2 | 1/2005 | Pan .................................... 365/233 |
| 6,850,449 B2 | 2/2005 | Takahashi ......................... 365/222 |
| 6,862,202 B2 | 3/2005 | Schaefer ............................. 365/52 |
| 6,862,249 B2 | 3/2005 | Kyung .............................. 365/233 |
| 6,862,653 B1 | 3/2005 | Dodd et al. ....................... 711/105 |
| 6,873,534 B2 | 3/2005 | Bhakta et al. ...................... 365/63 |
| 6,878,570 B2 | 4/2005 | Lyu et al. ......................... 438/106 |
| 6,894,933 B2 | 5/2005 | Kuzmenka et al. ............. 365/189 |
| 6,898,683 B2 | 5/2005 | Nakamura ....................... 711/167 |
| 6,908,314 B2 | 6/2005 | Brown ................................ 439/68 |
| 6,912,778 B2 | 7/2005 | Ahn et al. .......................... 29/852 |
| 6,914,786 B1 | 7/2005 | Paulsen et al. |
| 6,917,219 B2 | 7/2005 | New ................................... 326/41 |
| 6,922,371 B2 | 7/2005 | Takahashi et al. ............... 365/227 |
| 6,930,900 B2 | 8/2005 | Bhakta et al. ...................... 365/51 |
| 6,930,903 B2 | 8/2005 | Bhakta et al. ...................... 365/63 |
| 6,938,119 B2 | 8/2005 | Kohn et al. ....................... 711/105 |
| 6,943,450 B2 | 9/2005 | Fee et al. .......................... 257/773 |
| 6,944,748 B2 | 9/2005 | Sanches et al. |
| 6,947,341 B2 | 9/2005 | Stubbs et al. |
| 6,951,982 B2 | 10/2005 | Chye et al. ....................... 174/52 |
| 6,952,794 B2 | 10/2005 | Lu |
| 6,961,281 B2 | 11/2005 | Wong et al. ...................... 365/230 |
| 6,968,416 B2 | 11/2005 | Moy ................................. 710/310 |
| 6,968,419 B1 | 11/2005 | Holman ............................ 711/5 |
| 6,970,968 B1 | 11/2005 | Holman ............................ 711/5 |
| 6,980,021 B1 | 12/2005 | Srivastava et al. ............... 326/30 |
| 6,986,118 B2 | 1/2006 | Dickman ........................... 716/8 |
| 6,992,501 B2 | 1/2006 | Rapport ........................... 326/30 |
| 6,992,950 B2 | 1/2006 | Foss et al. ........................ 365/233 |
| 7,000,062 B2 | 2/2006 | Perego et al. ..................... 711/5 |
| 7,003,618 B2 | 2/2006 | Perego et al. ..................... 711/5 |
| 7,003,639 B2 | 2/2006 | Tsern et al. ....................... 711/154 |
| 7,007,095 B2 | 2/2006 | Chen et al. |
| 7,007,175 B2 | 2/2006 | Chang et al. ..................... 713/300 |
| 7,010,642 B2 | 3/2006 | Perego et al. ..................... 711/5 |
| 7,010,736 B1 | 3/2006 | Teh et al. .......................... 714/733 |
| 7,024,518 B2 | 4/2006 | Halbert et al. .................... 711/115 |
| 7,026,708 B2 | 4/2006 | Caty et al. ........................ 257/686 |
| 7,028,215 B2 | 4/2006 | Depew et al. |
| 7,028,234 B2 | 4/2006 | Huckaby et al. ................. 714/710 |
| 7,033,861 B1 | 4/2006 | Partridge et al. ................. 438/109 |
| 7,035,150 B2 | 4/2006 | Streif et al. ....................... 365/194 |
| 7,043,599 B1 | 5/2006 | Ware et al. ....................... 711/106 |
| 7,043,611 B2 | 5/2006 | McClannahan et al. |
| 7,045,396 B2 | 5/2006 | Crowley et al. ................. 438/123 |
| 7,045,901 B2 | 5/2006 | Lin et al. .......................... 257/778 |
| 7,046,538 B2 | 5/2006 | Kinsley et al. ................... 365/52 |
| 7,053,470 B1 | 5/2006 | Sellers et al. .................... 257/768 |
| 7,053,478 B2 | 5/2006 | Roper et al. ..................... 257/686 |
| 7,058,776 B2 | 6/2006 | Lee ................................... 711/167 |
| 7,058,863 B2 | 6/2006 | Kouchi et al. ................... 714/718 |
| 7,061,784 B2 | 6/2006 | Jakobs et al. .................... 365/51 |
| 7,061,823 B2 | 6/2006 | Faue et al. ....................... 365/230 |
| 7,066,741 B2 | 6/2006 | Burns et al. ..................... 439/69 |
| 7,075,175 B2 | 7/2006 | Kazi et al. ....................... 257/678 |
| 7,079,396 B2 | 7/2006 | Gates et al. |
| 7,079,441 B1 | 7/2006 | Partsch et al. .................. 365/226 |
| 7,079,446 B2 | 7/2006 | Murtagh et al. ................ 365/233 |
| 7,085,152 B2 | 8/2006 | Ellis et al. ....................... 365/149 |
| 7,085,941 B2 | 8/2006 | Li ..................................... 713/300 |
| 7,089,438 B2 | 8/2006 | Raad ................................ 713/322 |
| 7,093,101 B2 | 8/2006 | Aasheim et al. ................ 711/207 |
| 7,103,730 B2 | 9/2006 | Saxena et al. .................. 711/156 |
| 7,110,322 B2 | 9/2006 | Farmwald et al. |
| 7,119,428 B2 | 10/2006 | Tanie et al. ..................... 257/686 |
| 7,120,727 B2 | 10/2006 | Lee et al. ............................ 711/5 |
| 7,126,399 B1 | 10/2006 | Lee .................................. 327/261 |
| 7,127,567 B2 | 10/2006 | Ramakrishnan et al. |
| 7,133,960 B1 | 11/2006 | Thompson et al. ................ 711/5 |
| 7,136,978 B2 | 11/2006 | Miura et al. .................... 711/165 |
| 7,138,823 B2 | 11/2006 | Janzen et al. |
| 7,149,145 B2 | 12/2006 | Kim et al. ....................... 365/233 |
| 7,149,824 B2 | 12/2006 | Johnson .......................... 710/35 |
| 7,173,863 B2 | 2/2007 | Conley et al. .................. 365/189 |
| 7,200,021 B2 | 4/2007 | Raghuram ...................... 365/51 |
| 7,205,789 B1 | 4/2007 | Karabatsos ..................... 326/30 |
| 7,210,059 B2 | 4/2007 | Jeddeloh |
| 7,215,561 B2 | 5/2007 | Park et al. |
| 7,218,566 B1 | 5/2007 | Totolos, Jr. et al. |
| 7,224,595 B2 | 5/2007 | Dreps et al. .................... 365/63 |
| 7,228,264 B2 | 6/2007 | Barrenscheen et al. ........ 703/23 |
| 7,231,562 B2 | 6/2007 | Ohlhoff et al. |
| 7,233,541 B2 | 6/2007 | Yamamoto et al. ........... 365/230 |
| 7,234,081 B2 | 6/2007 | Nguyen et al. |
| 7,243,185 B2 | 7/2007 | See et al. |
| 7,245,541 B2 | 7/2007 | Janzen ........................... 365/198 |
| 7,254,036 B2 | 8/2007 | Pauley et al. .................. 361/721 |
| 7,266,639 B2 | 9/2007 | Raghuram ...................... 711/115 |
| 7,269,042 B2 | 9/2007 | Kinsley et al. ................. 365/52 |
| 7,269,708 B2 | 9/2007 | Ware ............................... 711/203 |
| 7,274,583 B2 | 9/2007 | Park et al. |
| 7,277,333 B2 | 10/2007 | Schaefer |
| 7,286,436 B2 | 10/2007 | Bhakta et al. ................. 365/230 |
| 7,289,386 B2 | 10/2007 | Bhakta et al. ................. 365/230 |
| 7,296,754 B2 | 11/2007 | Nishizawa et al. ........... 235/492 |
| 7,299,330 B2 | 11/2007 | Gillingham et al. .......... 711/167 |
| 7,302,598 B2 | 11/2007 | Suzuki et al. |
| 7,307,863 B2 | 12/2007 | Yen et al. ........................ 365/63 |
| 7,317,250 B2 | 1/2008 | Koh et al. |
| 7,337,293 B2 * | 2/2008 | Brittain et al. ................. 711/167 |
| 7,363,422 B2 | 4/2008 | Perego et al. .................. 711/105 |
| 7,366,947 B2 | 4/2008 | Gower et al. |
| 7,379,316 B2 | 5/2008 | Rajan ............................... 365/63 |
| 7,386,656 B2 | 6/2008 | Rajan et al. .................... 711/103 |
| 7,392,338 B2 | 6/2008 | Rajan et al. .................... 711/103 |
| 7,408,393 B1 | 8/2008 | Jain et al. ....................... 327/202 |
| 7,409,492 B2 | 8/2008 | Tanaka et al. .................. 711/103 |
| 7,414,917 B2 | 8/2008 | Ruckerbauer et al. |
| 7,428,644 B2 | 9/2008 | Jeddeloh et al. |
| 7,437,579 B2 | 10/2008 | Jeddeloh et al. ............... 713/300 |
| 7,441,064 B2 | 10/2008 | Gaskins |
| 7,457,122 B2 | 11/2008 | Lai et al. |
| 7,464,225 B2 | 12/2008 | Tsern ............................. 711/115 |
| 7,472,220 B2 | 12/2008 | Rajan et al. .................... 711/103 |
| 7,474,576 B2 | 1/2009 | Co et al. |
| 7,480,147 B2 | 1/2009 | Hoss et al. |
| 7,480,774 B2 | 1/2009 | Ellis et al. |
| 7,496,777 B2 | 2/2009 | Kapil .............................. 713/324 |
| 7,515,453 B2 | 4/2009 | Rajan .............................. 365/63 |
| 7,532,537 B2 | 5/2009 | Solomon et al. .............. 365/230 |
| 7,539,800 B2 | 5/2009 | Dell et al. |
| 7,573,136 B2 | 8/2009 | Jiang et al. |
| 7,580,312 B2 | 8/2009 | Rajan et al. |
| 7,581,121 B2 | 8/2009 | Barth et al. |
| 7,581,127 B2 | 8/2009 | Rajan et al. |
| 7,590,796 B2 | 9/2009 | Rajan et al. |
| 7,599,205 B2 | 10/2009 | Rajan |
| 7,606,245 B2 | 10/2009 | Ma et al. |
| 7,609,567 B2 | 10/2009 | Rajan et al. |
| 7,613,880 B2 | 11/2009 | Miura et al. |
| 7,619,912 B2 | 11/2009 | Bhakta et al. |
| 7,724,589 B2 | 5/2010 | Rajan et al. |
| 7,730,338 B2 | 6/2010 | Rajan et al. |

| Patent/Pub No. | Date | Inventor | Class |
|---|---|---|---|
| 7,761,724 B2 | 7/2010 | Rajan et al. | |
| 7,934,070 B2 * | 4/2011 | Brittain et al. | 711/167 |
| 7,990,797 B2 * | 8/2011 | Moshayedi et al. | 365/229 |
| 2001/0000822 A1 | 5/2001 | Dell et al. | 711/170 |
| 2001/0003198 A1 | 6/2001 | Wu | |
| 2001/0011322 A1 | 8/2001 | Stolt et al. | |
| 2001/0019509 A1 | 9/2001 | Aho et al. | |
| 2001/0021106 A1 | 9/2001 | Weber et al. | 361/790 |
| 2001/0021137 A1 | 9/2001 | Kai et al. | 365/222 |
| 2001/0046129 A1 | 11/2001 | Broglia et al. | |
| 2001/0046163 A1 | 11/2001 | Yanagawa | |
| 2002/0002662 A1 | 1/2002 | Olarig et al. | |
| 2002/0004897 A1 | 1/2002 | Kao et al. | |
| 2002/0015340 A1 | 2/2002 | Batinovich | |
| 2002/0019961 A1 | 2/2002 | Blodgett | 714/718 |
| 2002/0034068 A1 | 3/2002 | Weber et al. | 361/790 |
| 2002/0038405 A1 | 3/2002 | Leddige et al. | 711/115 |
| 2002/0041507 A1 | 4/2002 | Woo et al. | 365/51 |
| 2002/0051398 A1 | 5/2002 | Mizugaki | 365/222 |
| 2002/0060945 A1 | 5/2002 | Ikeda | |
| 2002/0060948 A1 | 5/2002 | Chang et al. | |
| 2002/0064073 A1 | 5/2002 | Chien | 365/200 |
| 2002/0064083 A1 | 5/2002 | Ryu et al. | 365/233 |
| 2002/0089831 A1 | 7/2002 | Forthun | 361/760 |
| 2002/0089970 A1 | 7/2002 | Asada et al. | |
| 2002/0094671 A1 | 7/2002 | Distefano et al. | |
| 2002/0121650 A1 | 9/2002 | Minamio et al. | |
| 2002/0121670 A1 | 9/2002 | Minamio et al. | |
| 2002/0124195 A1 | 9/2002 | Nizar | 713/320 |
| 2002/0129204 A1 | 9/2002 | Leighnor et al. | |
| 2002/0145900 A1 | 10/2002 | Schaefer | 365/52 |
| 2002/0165706 A1 | 11/2002 | Raynham | 703/25 |
| 2002/0167092 A1 | 11/2002 | Fee et al. | |
| 2002/0172024 A1 | 11/2002 | Hui et al. | |
| 2002/0174274 A1 | 11/2002 | Wu et al. | 710/100 |
| 2002/0184438 A1 | 12/2002 | Usui | 711/106 |
| 2003/0002262 A1 | 1/2003 | Benisek et al. | 361/728 |
| 2003/0011993 A1 | 1/2003 | Summers et al. | |
| 2003/0016550 A1 | 1/2003 | Yoo et al. | |
| 2003/0021175 A1 | 1/2003 | Tae Kwak | 365/219 |
| 2003/0026155 A1 | 2/2003 | Yamagata | |
| 2003/0026159 A1 | 2/2003 | Frankowsky et al. | |
| 2003/0035312 A1 | 2/2003 | Halbert et al. | 365/51 |
| 2003/0039158 A1 | 2/2003 | Horiguchi et al. | 365/200 |
| 2003/0041295 A1 | 2/2003 | Hou et al. | |
| 2003/0061458 A1 | 3/2003 | Wilcox et al. | 711/167 |
| 2003/0061459 A1 | 3/2003 | Aboulenein et al. | |
| 2003/0083855 A1 | 5/2003 | Fukuyama | |
| 2003/0088743 A1 | 5/2003 | Rader | |
| 2003/0093614 A1 | 5/2003 | Kohn et al. | 711/105 |
| 2003/0101392 A1 | 5/2003 | Lee | 714/718 |
| 2003/0105932 A1 | 6/2003 | David et al. | 711/167 |
| 2003/0117875 A1 | 6/2003 | Lee et al. | 365/226 |
| 2003/0123389 A1 | 7/2003 | Russell et al. | |
| 2003/0126338 A1 | 7/2003 | Dodd et al. | 710/305 |
| 2003/0127737 A1 | 7/2003 | Takahashi | |
| 2003/0131160 A1 | 7/2003 | Hampel et al. | 710/22 |
| 2003/0145163 A1 | 7/2003 | Seo et al. | 711/106 |
| 2003/0158995 A1 | 8/2003 | Lee et al. | 711/105 |
| 2003/0164539 A1 | 9/2003 | Yau | 257/686 |
| 2003/0164543 A1 | 9/2003 | Kheng Lee | |
| 2003/0182513 A1 | 9/2003 | Dodd et al. | 711/137 |
| 2003/0183934 A1 | 10/2003 | Barrett | 257/738 |
| 2003/0189868 A1 | 10/2003 | Riesenman et al. | 365/226 |
| 2003/0189870 A1 | 10/2003 | Wilcox | 365/233 |
| 2003/0191888 A1 | 10/2003 | Klein | 711/105 |
| 2003/0191915 A1 | 10/2003 | Saxena et al. | 711/160 |
| 2003/0200382 A1 | 10/2003 | Wells et al. | 711/106 |
| 2003/0200474 A1 | 10/2003 | Li | 713/320 |
| 2003/0205802 A1 | 11/2003 | Segaram | 257/690 |
| 2003/0206476 A1 | 11/2003 | Joo | 365/222 |
| 2003/0217303 A1 | 11/2003 | Chua-Eoan et al. | 713/600 |
| 2003/0223290 A1 | 12/2003 | Park et al. | 365/200 |
| 2003/0227798 A1 | 12/2003 | Pax | 365/189 |
| 2003/0229821 A1 | 12/2003 | Ma | 714/8 |
| 2003/0230801 A1 | 12/2003 | Jiang et al. | |
| 2003/0231540 A1 | 12/2003 | Lazar et al. | 365/222 |
| 2003/0231542 A1 | 12/2003 | Zaharinova-Papazova et al. | 365/226 |
| 2003/0234664 A1 | 12/2003 | Yamagata | |
| 2004/0016994 A1 | 1/2004 | Huang | |
| 2004/0027902 A1 | 2/2004 | Ooishi et al. | 365/222 |
| 2004/0034732 A1 | 2/2004 | Valin et al. | 714/4 |
| 2004/0034755 A1 | 2/2004 | LaBerge et al. | |
| 2004/0037133 A1 | 2/2004 | Park et al. | 365/202 |
| 2004/0042503 A1 | 3/2004 | Shaeffer et al. | |
| 2004/0044808 A1 | 3/2004 | Salmon et al. | 710/8 |
| 2004/0047228 A1 | 3/2004 | Chen | 365/232 |
| 2004/0057317 A1 | 3/2004 | Schaefer | 365/222 |
| 2004/0064647 A1 | 4/2004 | DeWhitt et al. | 711/135 |
| 2004/0064767 A1 | 4/2004 | Huckaby et al. | 714/710 |
| 2004/0083324 A1 | 4/2004 | Rabinovitz et al. | |
| 2004/0088475 A1 | 5/2004 | Streif et al. | 711/105 |
| 2004/0100837 A1 | 5/2004 | Lee | |
| 2004/0117723 A1 | 6/2004 | Foss | 714/805 |
| 2004/0123173 A1 | 6/2004 | Emberling et al. | 714/733 |
| 2004/0125635 A1 | 7/2004 | Kuzmenka | 365/51 |
| 2004/0133736 A1 | 7/2004 | Kyung | 711/105 |
| 2004/0139359 A1 | 7/2004 | Samson et al. | 713/320 |
| 2004/0145963 A1 | 7/2004 | Byon | 365/233 |
| 2004/0151038 A1 | 8/2004 | Ruckerbauer et al. | 365/200 |
| 2004/0174765 A1 | 9/2004 | Seo et al. | 365/233 |
| 2004/0177079 A1 | 9/2004 | Gluhovsky et al. | 707/100 |
| 2004/0178824 A1 | 9/2004 | Pan | 326/93 |
| 2004/0184324 A1 | 9/2004 | Pax | 365/189 |
| 2004/0186956 A1 | 9/2004 | Perego et al. | 711/115 |
| 2004/0188704 A1 | 9/2004 | Halbert et al. | 257/145 |
| 2004/0195682 A1 | 10/2004 | Kimura | |
| 2004/0196732 A1 | 10/2004 | Lee | 365/233 |
| 2004/0205433 A1 | 10/2004 | Gower et al. | |
| 2004/0208173 A1 | 10/2004 | Di Gregorio | 370/360 |
| 2004/0225858 A1 | 11/2004 | Brueggen | |
| 2004/0228166 A1 | 11/2004 | Braun et al. | 365/154 |
| 2004/0228196 A1 | 11/2004 | Kwak et al. | |
| 2004/0228203 A1 | 11/2004 | Koo | 365/233 |
| 2004/0230932 A1 | 11/2004 | Dickmann | 716/10 |
| 2004/0236877 A1 | 11/2004 | Burton | |
| 2004/0250989 A1 | 12/2004 | Im et al. | |
| 2004/0256638 A1 | 12/2004 | Perego et al. | 257/200 |
| 2004/0257847 A1 | 12/2004 | Matsui et al. | 365/63 |
| 2004/0260957 A1 | 12/2004 | Jeddeloh et al. | 713/300 |
| 2004/0264255 A1 | 12/2004 | Royer | 365/189 |
| 2004/0268161 A1 | 12/2004 | Ross | 713/300 |
| 2005/0018495 A1 | 1/2005 | Bhakta et al. | 365/199 |
| 2005/0021874 A1 | 1/2005 | Georgiou et al. | 709/250 |
| 2005/0024963 A1 | 2/2005 | Jakobs et al. | 365/202 |
| 2005/0027928 A1 | 2/2005 | Avraham et al. | 711/103 |
| 2005/0028038 A1 | 2/2005 | Pomaranski et al. | 714/42 |
| 2005/0034004 A1 | 2/2005 | Bunker et al. | |
| 2005/0036350 A1 | 2/2005 | So et al. | 365/63 |
| 2005/0041504 A1 | 2/2005 | Perego et al. | 365/222 |
| 2005/0044303 A1 | 2/2005 | Perego et al. | 711/5 |
| 2005/0044305 A1 | 2/2005 | Jakobs et al. | 711/105 |
| 2005/0047192 A1 | 3/2005 | Matsui et al. | 365/145 |
| 2005/0071543 A1 | 3/2005 | Ellis et al. | 711/106 |
| 2005/0078532 A1 | 4/2005 | Ruckerbauer et al. | 365/199 |
| 2005/0081085 A1 | 4/2005 | Ellis et al. | 714/5 |
| 2005/0086548 A1 | 4/2005 | Haid et al. | |
| 2005/0099834 A1 | 5/2005 | Funaba et al. | 365/63 |
| 2005/0102590 A1 | 5/2005 | Norris et al. | 714/719 |
| 2005/0105367 A1 | 5/2005 | Funaba et al. | 365/63 |
| 2005/0108460 A1 | 5/2005 | David | |
| 2005/0127531 A1 | 6/2005 | Tay et al. | |
| 2005/0132158 A1 | 6/2005 | Hampel et al. | 711/167 |
| 2005/0135176 A1 | 6/2005 | Ramakrishnan et al. | |
| 2005/0138267 A1 | 6/2005 | Bains et al. | 711/100 |
| 2005/0138304 A1 | 6/2005 | Ramakrishnan et al. | |
| 2005/0139977 A1 | 6/2005 | Nishio et al. | |
| 2005/0141199 A1 | 6/2005 | Chiou et al. | 361/704 |
| 2005/0149662 A1 | 7/2005 | Perego et al. | 711/5 |
| 2005/0152212 A1 | 7/2005 | Yang et al. | 365/233 |
| 2005/0156934 A1 | 7/2005 | Perego et al. | 345/531 |
| 2005/0166026 A1 | 7/2005 | Ware et al. | 711/167 |
| 2005/0193163 A1 | 9/2005 | Perego | 711/105 |
| 2005/0193183 A1 | 9/2005 | Barth et al. | |
| 2005/0194676 A1 | 9/2005 | Fukuda et al. | |
| 2005/0194991 A1 | 9/2005 | Dour et al. | 326/30 |
| 2005/0195629 A1 | 9/2005 | Leddige et al. | 365/51 |

| | | | | | | |
|---|---|---|---|---|---|---|
| 2005/0201063 A1 | 9/2005 | Lee et al. | | 2007/0070669 A1 | 3/2007 | Tsern ............................. 365/51 |
| 2005/0204111 A1 | 9/2005 | Natarajan ....................... 711/167 | | 2007/0088995 A1 | 4/2007 | Tsern et al. |
| 2005/0207255 A1 | 9/2005 | Perego et al. .................. 365/222 | | 2007/0091696 A1 | 4/2007 | Niggemeier et al. |
| 2005/0210196 A1 | 9/2005 | Perego et al. .................. 711/115 | | 2007/0106860 A1 | 5/2007 | Foster, Sr. et al. ............ 711/170 |
| 2005/0223179 A1 | 10/2005 | Perego et al. .................. 711/154 | | 2007/0136537 A1 | 6/2007 | Doblar et al. |
| 2005/0224948 A1 | 10/2005 | Lee et al. ....................... 257/686 | | 2007/0162700 A1 | 7/2007 | Fortin et al. ................... 711/118 |
| 2005/0232049 A1 | 10/2005 | Park | | 2007/0188997 A1 | 8/2007 | Hockanson et al. |
| 2005/0235119 A1 | 10/2005 | Sechrest et al. ................ 711/158 | | 2007/0192563 A1 | 8/2007 | Rajan et al. .................... 711/202 |
| 2005/0235131 A1 | 10/2005 | Ware ............................... 711/203 | | 2007/0195613 A1 | 8/2007 | Rajan et al. .................... 365/189 |
| 2005/0237838 A1 | 10/2005 | Kwak et al. ..................... 365/222 | | 2007/0204075 A1 | 8/2007 | Rajan et al. |
| 2005/0243635 A1 | 11/2005 | Schaefer | | 2007/0216445 A1 | 9/2007 | Raghavan et al. .............. 326/83 |
| 2005/0249011 A1 | 11/2005 | Maeda ............................ 365/222 | | 2007/0247194 A1 | 10/2007 | Jain ................................. 326/87 |
| 2005/0259504 A1 | 11/2005 | Murtugh et al. ................ 365/233 | | 2007/0279084 A1 | 12/2007 | Oh et al. |
| 2005/0263312 A1 | 12/2005 | Bolken et al. | | 2007/0288683 A1 | 12/2007 | Panabaker et al. ............. 711/101 |
| 2005/0265506 A1 | 12/2005 | Foss et al. ...................... 375/376 | | 2007/0288686 A1 | 12/2007 | Arcedera et al. ............... 711/103 |
| 2005/0269715 A1 | 12/2005 | Yoo ................................. 257/780 | | 2007/0288687 A1 | 12/2007 | Panabaker et al. ............. 711/103 |
| 2005/0278474 A1 | 12/2005 | Perersen et al. .................. 711/5 | | 2008/0002447 A1 | 1/2008 | Gulachenski et al. |
| 2005/0281096 A1 | 12/2005 | Bhakta et al. | | 2008/0010435 A1 | 1/2008 | Smith et al. |
| 2005/0281123 A1 | 12/2005 | Bell et al. ....................... 365/230 | | 2008/0025108 A1 | 1/2008 | Rajan et al. .................... 365/189 |
| 2005/0283572 A1 | 12/2005 | Ishihara ........................... 711/118 | | 2008/0025122 A1 | 1/2008 | Schakel et al. ................. 365/222 |
| 2005/0285174 A1 | 12/2005 | Saito et al. ...................... 257/296 | | 2008/0025136 A1 | 1/2008 | Rajan et al. .................... 365/230 |
| 2005/0286334 A1 | 12/2005 | Saito et al. | | 2008/0025137 A1 | 1/2008 | Rajan et al. .................... 365/239 |
| 2005/0289292 A1 | 12/2005 | Morrow et al. ................. 711/105 | | 2008/0027697 A1 | 1/2008 | Rajan et al. ...................... 703/14 |
| 2005/0289317 A1 | 12/2005 | Liou et al. ....................... 711/170 | | 2008/0027702 A1 | 1/2008 | Rajan et al. ...................... 703/21 |
| 2006/0002201 A1 | 1/2006 | Janzen ............................. 365/191 | | 2008/0027703 A1 | 1/2008 | Rajan et al. ...................... 703/21 |
| 2006/0010339 A1 | 1/2006 | Klein ................................... 714/5 | | 2008/0028135 A1 | 1/2008 | Rajan et al. |
| 2006/0026484 A1 | 2/2006 | Hollums ......................... 714/746 | | 2008/0028136 A1 | 1/2008 | Schakel et al. ................. 711/106 |
| 2006/0038597 A1 | 2/2006 | Becker et al. | | 2008/0028137 A1 | 1/2008 | Schakel et al. |
| 2006/0039204 A1 | 2/2006 | Cornelius | | 2008/0031030 A1 | 2/2008 | Rajan et al. ...................... 365/63 |
| 2006/0039205 A1 | 2/2006 | Cornelius ........................ 365/189 | | 2008/0031072 A1 | 2/2008 | Rajan et al. .................... 365/227 |
| 2006/0041711 A1 | 2/2006 | Miura et al. .................... 711/103 | | 2008/0037353 A1 | 2/2008 | Rajan et al. .................... 365/227 |
| 2006/0041730 A1 | 2/2006 | Larson | | 2008/0056014 A1 | 3/2008 | Rajan et al. .................... 365/189 |
| 2006/0044909 A1 | 3/2006 | Kinsley et al. ................. 365/222 | | 2008/0062773 A1 | 3/2008 | Rajan et al. .................... 365/189 |
| 2006/0044913 A1 | 3/2006 | Klein et al. ..................... 365/222 | | 2008/0065820 A1 | 3/2008 | Gillingham et al. ........... 711/105 |
| 2006/0049502 A1 | 3/2006 | Goodwin et al. ............... 257/686 | | 2008/0082763 A1 | 4/2008 | Rajan et al. .................... 711/154 |
| 2006/0050574 A1 | 3/2006 | Streif et al. ..................... 365/194 | | 2008/0086588 A1 | 4/2008 | Danilak et al. |
| 2006/0056244 A1 | 3/2006 | Ware ............................... 365/194 | | 2008/0089034 A1 | 4/2008 | Hoss et al. |
| 2006/0062047 A1 | 3/2006 | Bhakta et al. | | 2008/0098277 A1 | 4/2008 | Hazelzet |
| 2006/0067141 A1 | 3/2006 | Perego et al. .................. 365/200 | | 2008/0103753 A1 | 5/2008 | Rajan et al. |
| 2006/0085616 A1 | 4/2006 | Zeighami et al. .............. 711/167 | | 2008/0104314 A1 | 5/2008 | Rajan et al. |
| 2006/0087900 A1 | 4/2006 | Bucksch et al. | | 2008/0109206 A1 | 5/2008 | Rajan et al. |
| 2006/0090031 A1 | 4/2006 | Kirshenbaum et al. ........ 711/113 | | 2008/0109595 A1 | 5/2008 | Rajan et al. |
| 2006/0090054 A1 | 4/2006 | Choi et al. ...................... 711/167 | | 2008/0109597 A1 | 5/2008 | Schakel et al. |
| 2006/0106951 A1 | 5/2006 | Bains ................................. 710/5 | | 2008/0109598 A1 | 5/2008 | Schakel et al. |
| 2006/0112214 A1 | 5/2006 | Yeh .................................. 711/103 | | 2008/0115006 A1 | 5/2008 | Smith et al. .................... 713/601 |
| 2006/0112219 A1 | 5/2006 | Chawla et al. | | 2008/0120443 A1 | 5/2008 | Rajan et al. |
| 2006/0117152 A1 | 6/2006 | Amidi et al. .................... 711/154 | | 2008/0120458 A1 | 5/2008 | Gillingham et al. ........... 711/105 |
| 2006/0117160 A1 | 6/2006 | Jackson et al. ................. 711/170 | | 2008/0123459 A1 | 5/2008 | Rajan et al. .................... 365/227 |
| 2006/0118933 A1 | 6/2006 | Haba ................................ 257/678 | | 2008/0126624 A1 | 5/2008 | Prete et al. |
| 2006/0120193 A1 | 6/2006 | Casper ............................ 365/222 | | 2008/0126687 A1 | 5/2008 | Rajan et al. |
| 2006/0123265 A1 | 6/2006 | Ruckerbauer et al. ......... 713/500 | | 2008/0126688 A1 | 5/2008 | Rajan et al. |
| 2006/0126369 A1 | 6/2006 | Raghuram ....................... 365/51 | | 2008/0126689 A1 | 5/2008 | Rajan et al. |
| 2006/0129712 A1 | 6/2006 | Raghuram ....................... 710/52 | | 2008/0126690 A1 | 5/2008 | Rajan et al. .................... 711/105 |
| 2006/0129740 A1 | 6/2006 | Ruckerbauer et al. | | 2008/0126692 A1 | 5/2008 | Rajan et al. |
| 2006/0129755 A1 | 6/2006 | Raghuram ...................... 711/105 | | 2008/0133825 A1 | 6/2008 | Rajan et al. |
| 2006/0133173 A1 | 6/2006 | Jain et al. ........................ 365/222 | | 2008/0155136 A1 | 6/2008 | Hishino |
| 2006/0136791 A1 | 6/2006 | Nierle | | 2008/0159027 A1 | 7/2008 | Kim |
| 2006/0149982 A1 | 7/2006 | Vogt ................................ 713/320 | | 2008/0170425 A1 | 7/2008 | Rajan |
| 2006/0174082 A1 | 8/2006 | Bellows et al. | | 2008/0195894 A1 | 8/2008 | Schreck et al. |
| 2006/0176744 A1 | 8/2006 | Stave .............................. 365/194 | | 2008/0215832 A1 | 9/2008 | Allen et al. |
| 2006/0179262 A1* | 8/2006 | Brittain et al. ................. 711/169 | | 2008/0239857 A1 | 10/2008 | Rajan et al. .................... 365/227 |
| 2006/0179333 A1 | 8/2006 | Brittain et al. ................. 713/320 | | 2008/0239858 A1 | 10/2008 | Rajan et al. .................... 365/227 |
| 2006/0179334 A1 | 8/2006 | Brittain et al. ................. 713/320 | | 2008/0256282 A1 | 10/2008 | Guo et al. |
| 2006/0180926 A1 | 8/2006 | Mullen et al. | | 2009/0024789 A1 | 1/2009 | Rajan et al. |
| 2006/0181953 A1 | 8/2006 | Rotenberg et al. ............. 365/230 | | 2009/0024790 A1 | 1/2009 | Rajan et al. |
| 2006/0195631 A1 | 8/2006 | Rajamani | | 2009/0109613 A1 | 4/2009 | Legen et al. |
| 2006/0198178 A1 | 9/2006 | Kinsley et al. ................... 365/52 | | 2009/0216939 A1 | 8/2009 | Smith et al. |
| 2006/0203590 A1 | 9/2006 | Mori et al. ...................... 365/222 | | 2009/0285031 A1 | 11/2009 | Rajan et al. |
| 2006/0206738 A1 | 9/2006 | Jeddeloh et al. ................ 713/320 | | 2009/0290442 A1 | 11/2009 | Rajan |
| 2006/0233012 A1 | 10/2006 | Sekiguchi et al. ............... 365/51 | | 2010/0005218 A1 | 1/2010 | Gower et al. |
| 2006/0236165 A1 | 10/2006 | Cepulis et al. | | 2010/0020585 A1 | 1/2010 | Rajan |
| 2006/0236201 A1 | 10/2006 | Gower et al. | | 2010/0257304 A1 | 10/2010 | Rajan et al. |
| 2006/0248261 A1 | 11/2006 | Jacob et al. | | 2010/0271888 A1 | 10/2010 | Rajan |
| 2006/0248387 A1 | 11/2006 | Nicholson et al. ............... 714/22 | | 2010/0281280 A1 | 11/2010 | Rajan et al. |
| 2006/0262586 A1 | 11/2006 | Solomon et al. ................. 365/63 | | | | |
| 2006/0294295 A1 | 12/2006 | Fukuzo ........................... 711/105 | | FOREIGN PATENT DOCUMENTS | | |
| 2007/0005998 A1 | 1/2007 | Jain et al. | | DE | 102004053316 | 5/2006 |
| 2007/0050530 A1 | 3/2007 | Rajan .................................. 711/5 | | DE | 102005036528 | 2/2007 |
| 2007/0058471 A1 | 3/2007 | Rajan et al. .................... 365/222 | | EP | 0644547 | 3/1995 |

| | | |
|---|---|---|
| JP | 62121978 | 6/1987 |
| JP | 01-171047 | 7/1989 |
| JP | 03-29357 | 2/1991 |
| JP | 03-286234 | 12/1991 |
| JP | 03276487 B2 | 12/1991 |
| JP | 07-141870 | 6/1995 |
| JP | 08-77097 | 3/1996 |
| JP | 11-149775 | 6/1999 |
| JP | 22025255 A2 | 1/2002 |
| JP | 3304893 B2 | 5/2002 |
| JP | 2006236388 | 9/2006 |
| KR | 102004006271 | 7/2004 |
| WO | WO95/05676 | 2/1995 |
| WO | PCT/JP98/02866 | 1/1999 |
| WO | WO9900734 | 1/1999 |
| WO | WO00/45270 | 8/2000 |
| WO | WO01/90900 | 11/2001 |
| WO | WO01/97160 | 12/2001 |
| WO | WO2004/051645 | 6/2004 |
| WO | WO2007/002324 | 1/2007 |
| WO | WO2007/028109 | 3/2007 |
| WO | WO2007/038225 | 4/2007 |
| WO | WO2007/095080 | 8/2007 |
| WO | WO2008/063251 | 5/2008 |

OTHER PUBLICATIONS

Final Office Action from U.S. Appl. No. 11/588,739 Dated Dec. 15, 2010.
Notice of Allowance from U.S. Appl. No. 11/762,010 Dated Feb. 18, 2011.
Final Office Action from U.S. Appl. No. 11/828,182 Dated Dec. 22, 2010.
Non-Final Office Action from U.S. Appl. No. 11/855,826 Dated Jan. 13, 2011.
Notice of Allowance from U.S. Appl. No. 11/939,432 Dated Feb. 18, 2011.
Notice of Allowance from U.S. Appl. No. 12/144,396 Dated Feb. 1, 2011.
Non-Final Office Action from U.S. Appl. No. 12/816,756 Dated Feb. 7, 2011.
Notice of Allowance from U.S. Appl. No. 11/762,013 Dated Feb. 23, 2011.
Notice of Allowance from U.S. Appl. No. 11/929,500 Dated Feb. 24, 2011.
Notice of Allowance from U.S. Appl. No. 11/763,365 Dated Mar. 1, 2011.
Final Office Action from U.S. Appl. No. 12/574,628 Dated Mar. 3, 2011.
Final Office Action from U.S. Appl. No. 11/929,571 Dated Mar. 3, 2011.
Notice of Allowance from U.S. Appl. No. 11/611,374 Dated Mar. 4, 2011.
Notice of Allowance from U.S. Appl. No. 11/929,483 Dated Mar. 4, 2011.
Notice of Allowance from U.S. Appl. No. 11/553,399 Dated Mar. 18, 2011.
Final Office Action from U.S. Appl. No. 12/507,682 Dated Mar. 29, 2011.
Non-Final Office Action from U.S. Appl. No. 11/929,403 Dated Mar. 31, 2011.
Notice of Allowance from U.S. Appl. No. 12/838,896 Dated Apr. 19, 2011.
Notice of Allowance from U.S. Appl. No. 11/702,981 Dated Apr. 25, 2011.
Notice of Allowance from U.S. Appl. No. 11/929,320 Dated May 5, 2011.
Final Office Action from U.S. Appl. No. 11/939,440 Dated May 19, 2011.
Final Office Action from U.S. Appl. No. 11/855,805, Dated May 26, 2011.
Non-Final Office Action from U.S. Appl. No. 11/672,921 Dated May 27, 2011.
Notice of Allowance from U.S. Appl. No. 11/762,010 Dated Jun. 8, 2011.

AMD, BIOS and Kernel Developer's Guide (BKDG) Family 10h Processor, Sep. 7, 2007, Published for Processor Family Purchasers.
Final Office Action From U.S. Appl. No. 11/461,430 Mailed Sep. 8, 2008.
Final Office Action From U.S. Appl. No. 11/461,435 Mailed Jan. 28, 2009.
German Office Action From German Patent Application No. 11 2006 002 300.4-55 Mailed Jun. 5, 2009 (With Translation).
Non-Final Office Action From U.S. Appl. No. 11/461,427 Mailed Sep. 5, 2008.
Non-Final Office Action From U.S. Appl. No. 11/461,430 Mailed Feb. 19, 2009.
Non-Final Office Action From U.S. Appl. No. 11/461,437 Mailed Jan. 26, 2009.
Non-Final Office Action From U.S. Appl. No. 11/461,441 Mailed Apr. 2, 2009.
Non-Final Office Action From U.S. Appl. No. 11/611,374 Mailed Mar. 23, 2009.
Non-Final Office Action From U.S. Appl. No. 11/702,981 Mailed Mar. 11, 2009.
Non-Final Office Action From U.S. Appl. No. 11/762,010 Mailed Mar. 20, 2009.
Non-Final Office Action From U.S. Appl. No. 11/939,432 Mailed Feb. 6, 2009.
Non-Final Office Action From U.S. Appl. No. 12/111,819 Mailed Apr. 27, 2009.
Non-Final Office Action From U.S. Appl. No. 12/111,828 Mailed Apr. 17, 2009.
Notice of Allowance From U.S. Appl. No. 11/474,075 Mailed Nov. 26, 2008.
Office Action From U.S. Appl. No. 11/474,076 Mailed Nov. 3, 2008.
Office Action From U.S. Appl. No. 11/524,811 Mailed Sep. 17, 2008.
IB-US2006024360 Search Report.
IB-US2006024360 Written Opinion.
IB-US2006634390 Search Report of Nov. 21, 2007.
IB-US2006634390 Written Opinion.
Kellerbauer, R. "Die Schnelle Million". Retrieved Apr. 1, 2008. Published on the Internet (German): <URL:http://Ct.Coremelt.Net/Html/91/12/276/Art.Htm>.
Kellerbauer, R. "The Quick Million". Translated From German as Published on the Internet: <URL:http://Ct.Coremelt.Net/Htm1/91/12/276/Art.Htm>. Published as early as Dec. 1991.
Skerlj et al. "Buffer Device for Memory Modules". 2006. Qimonda—German IP Publication as DE2006J54505_2006E53858DE.
Using Two Chip Selects to Enable Quad Rank. Retrieved on Feb. 26, 2008. From IP.Com # 000132468D.
Wu et al., "eNVy: A Non-Volatile, Main Memory Storage System",ASPLOS-VI Proceedings, Oct. 4-7, 1994. SIGARCH Computer Architecture News 22 (Special Issue Oct. 1994).
Non-Final Office Action from U.S. Appl. No. 11/461,420 Dated Jul. 23, 2009.
Notice of Allowance from U.S. Appl. No. 11/461,430 Dated Sep. 9, 2009.
Non-Final Office Action from U.S. Appl. No. 11/461,435 Dated Aug. 5, 2009.
Non-Final Office Action from U.S. Appl. No. 11/515,167 Dated Sep. 25, 2009.
Non-Final Office Action from U.S. Appl. No. 11/515,223 Dated Sep. 22, 2009.
Non-Final Office Action from U.S. Appl. No. 11/538,041 Dated Jun. 10, 2009.
Non-Final Office Action from U.S. Appl. No. 11/553,372 Dated Jun. 25, 2009.
Notice of Allowance from U.S. Appl. No. 11/553,372 Dated Sep. 30, 2009.
Non-Final Office Action from U.S. Appl. No. 11/553,390 Dated Sep. 9, 2009.
Non-Final Office Action from U.S. Appl. No. 11/553,399 Dated Jul. 7, 2009.
Notice of Allowance from U.S. Appl. No. 11/553,399 Dated Oct. 13, 2009.

Notice of Allowance from U.S. Appl. No. 11/611,374 Dated Sep. 15, 2009.
Non-Final Office Action from U.S. Appl. No. 11/702,960 Dated Sep. 25, 2009.
Non-Final Office Action from U.S. Appl. No. 11/702,981 Dated Aug. 19, 2009.
Non-Final Office Action from U.S. Appl. No. 11/762,013 Dated Jun. 5, 2009.
Non-Final Office Action from U.S. Appl. No. 11/763,365 Dated Oct. 28, 2009.
Non-Final Office Action from U.S. Appl. No. 11/858,518 Dated Aug. 14, 2009.
Non-Final Office Action from U.S. Appl. No. 11/929,500 Dated Oct. 13, 2009.
Notice of Allowance from U.S. Appl. No. 11/939,432 Dated Sep. 24, 2009.
Non-Final Office Action from U.S. Appl. No. 11/941,589 Dated Oct. 1, 2009.
Supplemental European Search Report and Search Opinion issued Sep. 21, 2009 in European Application No. 07870726.2, 8 pp.
Wu et al., "eNVy: A Non-Volatile, Main Memory Storage System", ASPLOS-VI Proceedings, Oct. 4-7, 1994, pp. 86-97.
Buffer Device for Memory Modules (DIMM), IP.com Prior Art Database, <URL: http://ip.com/IPCOM/000144850>, Feb. 10, 2007, 1 pg.
Great Britain Office Action from GB Patent Application No. GB0803913.3 Dated Mar. 1, 2010.
Written Opinion From PCT Application No. PCT/US06/34390 Dated on Nov. 21, 2007.
International Preliminary Examination Report From PCT Application No. PCT/US07/016385 Dated Feb. 3, 2009.
Search Report and Written Opinion From PCT Application No. PCT/US07/03460 Dated on Feb. 14, 2008.
Final Office Action from U.S. Appl. No. 11/461,435 Dated May 13, 2010.
Final Office Action from U.S. Appl. No. 11/515,167 Dated Jun. 3, 2010.
Notice of Allowance from U.S. Appl. No. 11/515,223 Dated Jul. 30, 2010.
Notice of Allowance from U.S. Appl. No. 11/553,372 Dated Aug. 4, 2010.
Final Office Action from U.S. Appl. No. 11/553,390 Dated Jun. 24, 2010.
Notice of Allowance from U.S. Appl. No. 11/553,399 Dated Dec. 3, 2010.
Notice of Allowance from U.S. Appl. No. 11/611,374 Dated Jul. 19, 2010.
Notice of Allowance from U.S. Appl. No. 11/611,374 Dated Oct. 29, 2010.
Final Office Action from U.S. Appl. No. 11/672,921 Dated Jul. 23, 2010.
Final Office Action from U.S. Appl. No. 11/672,924 Dated Sep. 7, 2010.
Final Office Action from U.S. Appl. No. 11/702,960 Dated Jun. 21, 2010.
Notice of Allowance from U.S. Appl. No. 11/762,010 Dated Jul. 2, 2010.
Notice of Allowance from U.S. Appl. No. 11/762,010 Dated Oct. 22, 2010.
Notice of Allowance from U.S. Appl. No. 11/762,013 Dated Aug. 17, 2010.
Notice of Allowance from U.S. Appl. No. 11/762,013 Dated Dec. 7, 2010.
Notice of Allowance from U.S. Appl. No. 11/763,365 Dated Jun. 29, 2010.
Notice of Allowance from U.S. Appl. No. 11/763,365 Dated Oct. 20, 2010.
Non-Final Office Action from U.S. Appl. No. 11/828,181 Dated Mar. 2, 2010.
Non-Final Office Action from U.S. Appl. No. 11/855,805 Dated Sep. 21, 2010.
Non-Final Office Action from U.S. Appl. No. 11/858,518 Dated Sep. 8, 2010.
Final Office Action from U.S. Appl. No. 11/929,225 Dated Aug. 27, 2010.
Final Office Action from U.S. Appl. No. 11/929,261 Dated Sep. 7, 2010.
Final Office Action from U.S. Appl. No. 11/929,286 Dated Aug. 20, 2010.
Notice of Allowance from U.S. Appl. No. 11/929,320 Dated Sep. 29, 2010.
Final Office Action from U.S. Appl. No. 11/929,403 Dated Aug. 31, 2010.
Final Office Action from U.S. Appl. No. 11/929,417 Dated Aug. 31, 2010.
Final Office Action from U.S. Appl. No. 11/929,432 Dated Aug. 20, 2010.
Final Office Action from U.S. Appl. No. 11/929,450 Dated Aug. 20, 2010.
Notice of Allowance from U.S. Appl. No. 11/929,483 Dated Oct. 7, 2010.
Final Office Action from U.S. Appl. No. 11/929,500 Dated Jun. 24, 2010.
Final Office Action from U.S. Appl. No. 11/929,631 Dated Nov. 18, 2010.
Final Office Action from U.S. Appl. No. 11/929,655 Dated Nov. 22, 2010.
Non-Final Office Action from U.S. Appl. No. 11/939,440 Dated Sep. 17, 2010.
Notice of Allowance from U.S. Appl. No. 11/941,589 Dated Oct. 25, 2010.
Non-Final Office Action from U.S. Appl. No. 12/057,306 Dated Oct. 8, 2010.
Non-Final Office Action from U.S. Appl. No. 12/203,100 Dated Dec. 1, 2010.
Non-Final Office Action from U.S. Appl. No. 12/574,628 Dated Jun. 10, 2010.
Non-Final Office Action from U.S. Appl. No. 12/769,428 Dated Nov. 8, 2010.
Non-Final Office Action from U.S. Appl. No. 12/838,896 Dated Sep. 3, 2010.
Great Britain Office Action from GB Patent Application No. GB0800734.6 Mailed Mar. 1, 2010.
Final Office Action from U.S. Appl. No. 11/461,420 Mailed Apr. 28, 2010.
Notice of Allowance from U.S. Appl. No. 11/553,372 Mailed Mar. 12, 2010.
Notice of Allowance from U.S. Appl. No. 11/553,399 Mailed Mar. 22, 2010.
Non-Final Office Action from U.S. Appl. No. 11/588,739 Mailed Dec. 29, 2009.
Notice of Allowance from U.S. Appl. No. 11/611,374 Mailed Apr. 5, 2010.
Non-Final Office Action from U.S. Appl. No. 11/828,181 Mailed Mar. 2, 2010.
Non-Final Office Action from U.S. Appl. No. 11/828,182 Mailed Mar. 29, 2010.
Final Office Action from U.S. Appl. No. 11/858,518 Mailed Apr. 21, 2010.
Non-Final Office Action from U.S. Appl. No. 11/929,432 Mailed Jan. 14, 2010.
Non-Final Office Action from U.S. Appl. No. 11/929,571 Mailed Mar. 3, 2010.
Non-Final Office Action from U.S. Appl. No. 11/929,631 Mailed Mar. 3, 2010.
Non-Final Office Action from U.S. Appl. No. 11/929,636 Mailed Mar. 9, 2010.
Non-Final Office Action from U.S. Appl. No. 11/929,655 Mailed Mar. 3, 2010.
Notice of Allowance from U.S. Appl. No. 11/939,432 Mailed Dec. 1, 2009.
Non-Final Office Action from U.S. Appl. No. 11/939,432 Mailed Apr. 12, 2010.
Notice of Allowance from U.S. Appl. No. 12/111,819 Mailed Mar. 10, 2010.

Non-Final Office Action from U.S. Appl. No. 12/507,682 Mailed Mar. 8, 2010.
Final Rejection From U.S. Appl. No. 11/461,437 Mailed Nov. 10, 2009.
Final Rejection from U.S. Appl. No. 11/762,010 Mailed Dec. 4, 2009.
Non-Final Rejection from U.S. Appl. No. 11/672,921 Mailed Dec. 8, 2009.
Non-Final Rejection from U.S. Appl. No. 11/672,924 Mailed Dec. 14, 2009.
Non-Final Rejection from U.S. Appl. No. 11/929,225 Mailed Dec. 14, 2009.
Non-Final Rejection from U.S. Appl. No. 11/929,261 Mailed Dec. 14, 2009.
Notice of Allowance From U.S. Appl. No. 11/611,374 Mailed Nov. 30, 2009.
Notice of Allowance From U.S. Appl. No. 12/111,819 Mailed Nov. 20, 2009.
Notice of Allowance From U.S. Appl. No. 12/111,828 Mailed Dec. 15, 2009.
Fang et al., W. Power Complexity Analysis of Adiabatic SRAM, 6th Int. Conference on ASIC, vol. 1, Oct. 2005, pp. 334-337.
Pavan et al., P. A Complete Model of E2PROM Memory Cells for Circuit Simulations, IEEE Transactions on Computer-Aided Design of Integrated Circuits and Systems, vol. 22, No. 8, Aug. 2003, pp. 1072-1079.
German Office Action From German Patent Application No. 11 2006 001 810.8-55 Mailed Apr. 20, 2009 (With Translation).
Office Action, including English translation, from co-pending Japanese application No. 2008-529353, Dated Jan. 10, 2012.
European Search Report from co-pending European application No. 11194876.6-2212/2450798, Dated Apr. 12, 2012.
European Search Report from co-pending European application No. 11194862.6-2212/2450800, Dated Apr. 12, 2012.
European Search Report from co-pending European application No. 11194883.2-2212, Dated Apr. 27, 2012.

* cited by examiner

-- PRIOR ART --

-- PRIOR ART --

-- PRIOR ART --

CONFIGURABLE MEMORY SYSTEM WITH INTERFACE CIRCUIT

CROSS-REFERENCE TO RELATED APPLICATIONS

This application claims the priority benefit of Provisional U.S. Patent Application Ser. No. 61/083,878, filed Jul. 25, 2008, the subject matter of which is hereby incorporated herein by reference.

BACKGROUND OF THE INVENTION

1. Field of the Invention

Embodiments of the present invention generally relate to memory systems and, more specifically, to improvements to such memory systems.

2. Description of the Related Art

Dual inline memory modules (DIMMs) are typically constructed as single-rank, dual-rank, or quad-rank modules, wherein a rank refers to the plurality of memory circuits (e.g. DRAMs) that are controlled by a common control (e.g. chip select) signal and are accessed in parallel by a system that includes a memory controller. These memory modules typically have 64 data bits (i.e. 64-bit wide memory module or memory module with 64-bit wide rank(s)), and optionally may include an additional 8 check bits that provide error detection and correction capability (i.e. 72-bit wide memory module or memory module with 72-bit wide rank(s)).

Standard memory circuits are available with a 16-bit wide data bus (e.g. ×16 DRAM), an 8-bit wide data bus (e.g. ×8 DRAM), or a 4-bit wide data bus (e.g. ×4 DRAM). Consequently, a 72-bit wide memory module requires nine 8-bit wide memory circuits per rank or eighteen 4-bit wide memory circuits per rank. Since memory circuit failures are not an uncommon occurrence, computer architects have developed a technique that allows mission-critical computers to continue operating in the event that a single memory circuit per rank fails. This technique is known by various trademarks such as Chipkill, Advanced ECC, or SDDC (Single Device Data Correction). Modern Chipkill or SDDC requires the use of eighteen memory circuits in parallel to be tolerant to the loss of a single circuit. Memory modules with ×4 memory circuits are typically used in mission-critical servers since they have eighteen memory circuits per rank, and thus provide the server with the ability to continue operating when a single memory circuit per rank has failed.

Memory modules with ×4 memory circuits usually dissipate more power than modules with ×8 memory circuits since eighteen memory circuits respond in parallel to each command from the memory controller whereas only nine memory circuits respond in parallel on modules with ×8 memory circuits. Many server manufacturers choose to offer only memory modules with ×4 memory circuits on some of their server models while choosing to offer memory modules with ×8 memory circuits on other server models. As a result, the end user has less flexibility to select between higher memory reliability and lower memory power.

The different ranks on a memory module share the data bus of the module. For example, in a dual-rank memory module, DQ[3:0] of the module's data bus is connected to the data pins of the memory circuit corresponding to DQ[3:0] of rank 0 and to the data pins of the memory circuit corresponding to DQ[3:0] of rank 1.

Since the ranks on a memory module share the data bus, the memory controller allows for one or more bus turnaround or idle clock cycles between accessing a first rank and accessing a second rank. This turnaround time ensures that there is sufficient time for the memory circuits of the first rank to disconnect from the data bus (e.g. post-amble) and for memory circuits of the second rank to connect to the data bus (e.g. pre-amble). For example, when the memory controller sends a read command to a first rank followed by a read command to a second rank, it ensures that there is at least one clock cycle between the last data from the first rank and the first data from the second rank. This turnaround time creates "bubbles" or idle clock cycles on the shared data bus that interconnects the memory controller and the memory modules, which reduces the utilization of the data bus, which in turn lowers the maximum sustained bandwidth of the memory subsystem.

As the foregoing illustrates, what is needed in the art is a memory subsystem and method that overcome the shortcomings of prior art systems.

SUMMARY OF THE INVENTION

One embodiment of the present invention sets forth an interface circuit that emulates a memory circuit having a first organization using a memory circuit having a second organization, wherein the second organization includes a number of banks, a number of rows, a number of columns, and a number of bits per column. The interface circuit also enables memory modules with one or more configurable aspects, wherein the aspect includes number of ranks, power, reliability, performance, access type, and timing.

One advantage of the disclosed interface circuit and memory subsystem is that it can provide higher memory performance by not requiring idle bus cycles to turn around the data bus when switching from reading from one rank to reading from another rank, or from writing to one rank to writing to another rank. Another advantage of the disclosed interface circuit and memory subsystem is that it can enable the end user to select between higher memory subsystem reliability and lower memory subsystem power dissipation.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
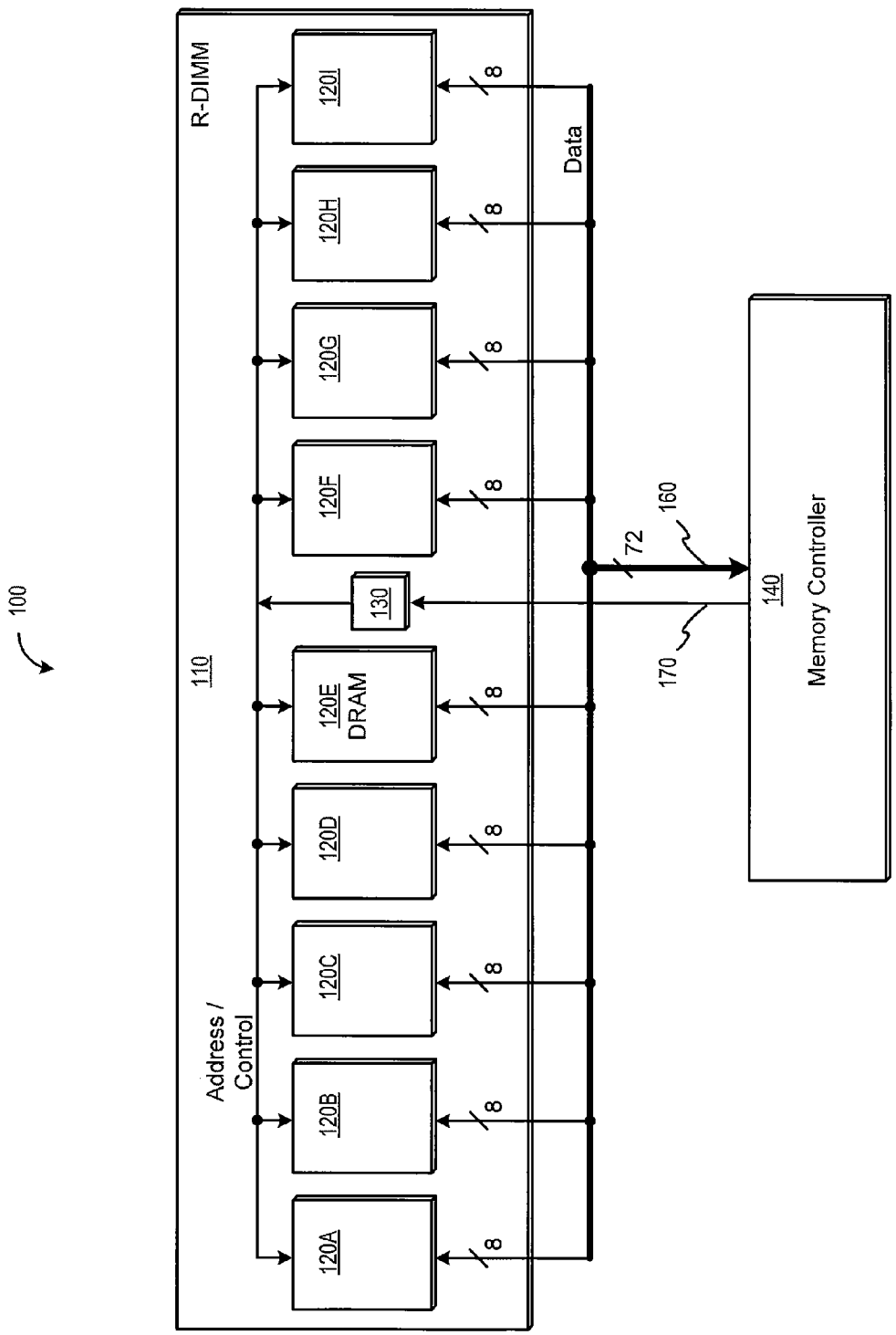
FIG. 1 illustrates a memory subsystem, one component of which is a single-rank memory module (e.g. registered DIMM or R-DIMM) that uses ×8 memory circuits (e.g. DRAMs), according to prior art.

FIG. 1 illustrates some of the major components of a memory subsystem 100, according to prior art. As shown, the memory subsystem 100 includes a memory controller 140 and a single-rank memory module 110 interconnected via a memory bus that includes a data bus 160 and an address and control bus 170. As shown, the memory module 110 is composed of a rank of ×8 memory circuits (e.g. DRAMs) 120A-I and an interface circuit 130 that performs the address and control register function. When the memory controller 140 performs, say, a read from the single rank of memory circuits 120A-I on memory module 110, all the nine memory circuits 120A-I respond in parallel to the read.

Figure 2:
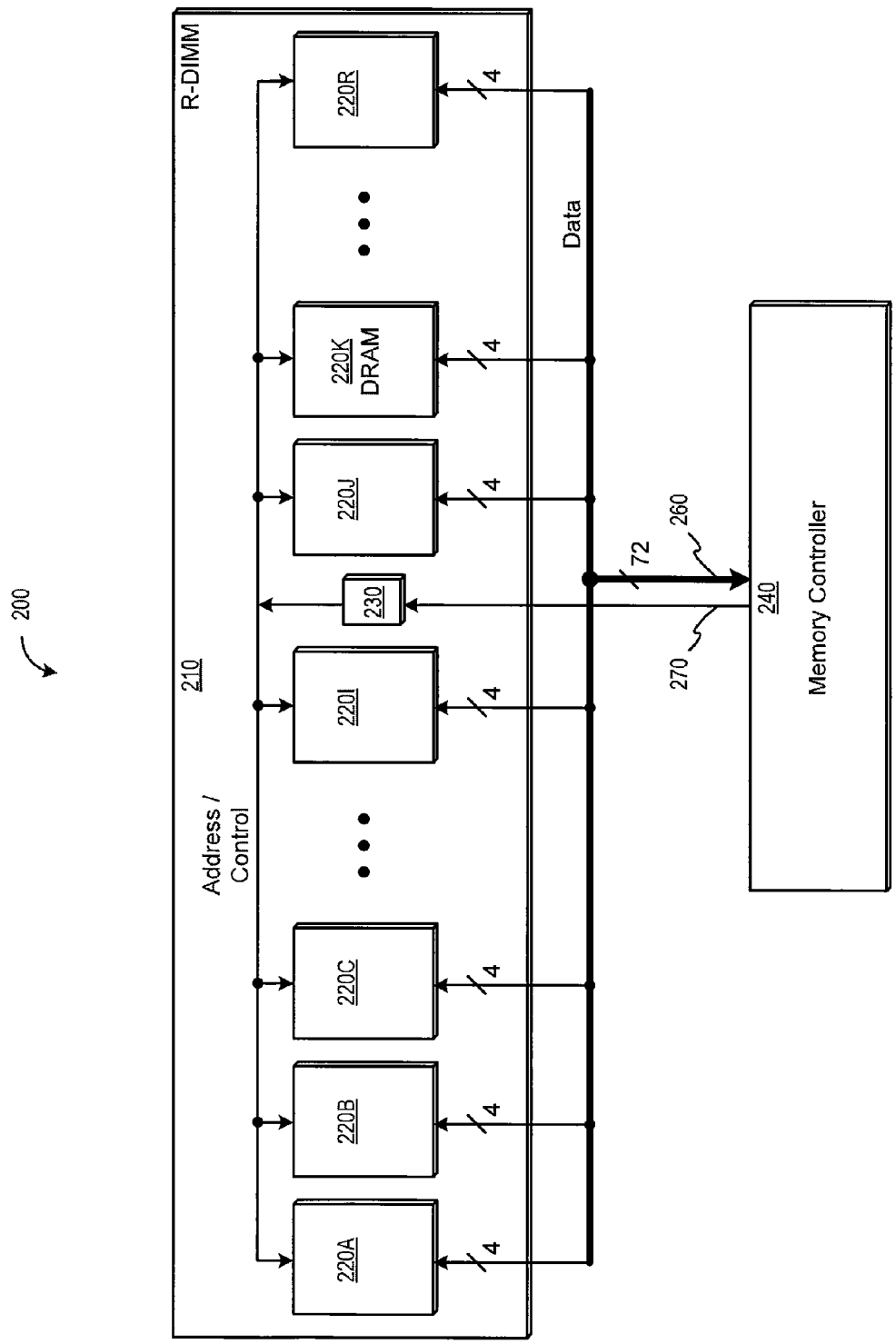
FIG. 2 illustrates a memory subsystem, one component of which is a single-rank memory module that uses ×4 memory circuits, according to prior art.

FIG. 2 illustrates some of the major components of a memory subsystem 200, according to prior art. As shown, the memory subsystem 200 includes a memory controller 240 and a single-rank memory module 210 interconnected via a memory bus that includes a data bus 260 and an address and control bus 270. As shown, the memory module 210 is composed of a rank of ×4 memory circuits 220A-R and an interface circuit 230 that performs the address and control register function. When the memory controller 240 performs, say, a read from the single rank of memory circuits 220A-R on memory module 210, all the eighteen memory circuits 220A-R respond in parallel to the read. It should be noted that the memory circuits 220A-R may be transposed on the module 210 in many ways. For example, half the memory circuits may be on a first side of the module 210 while the other half may be on a second side of the module.

Figure 3:
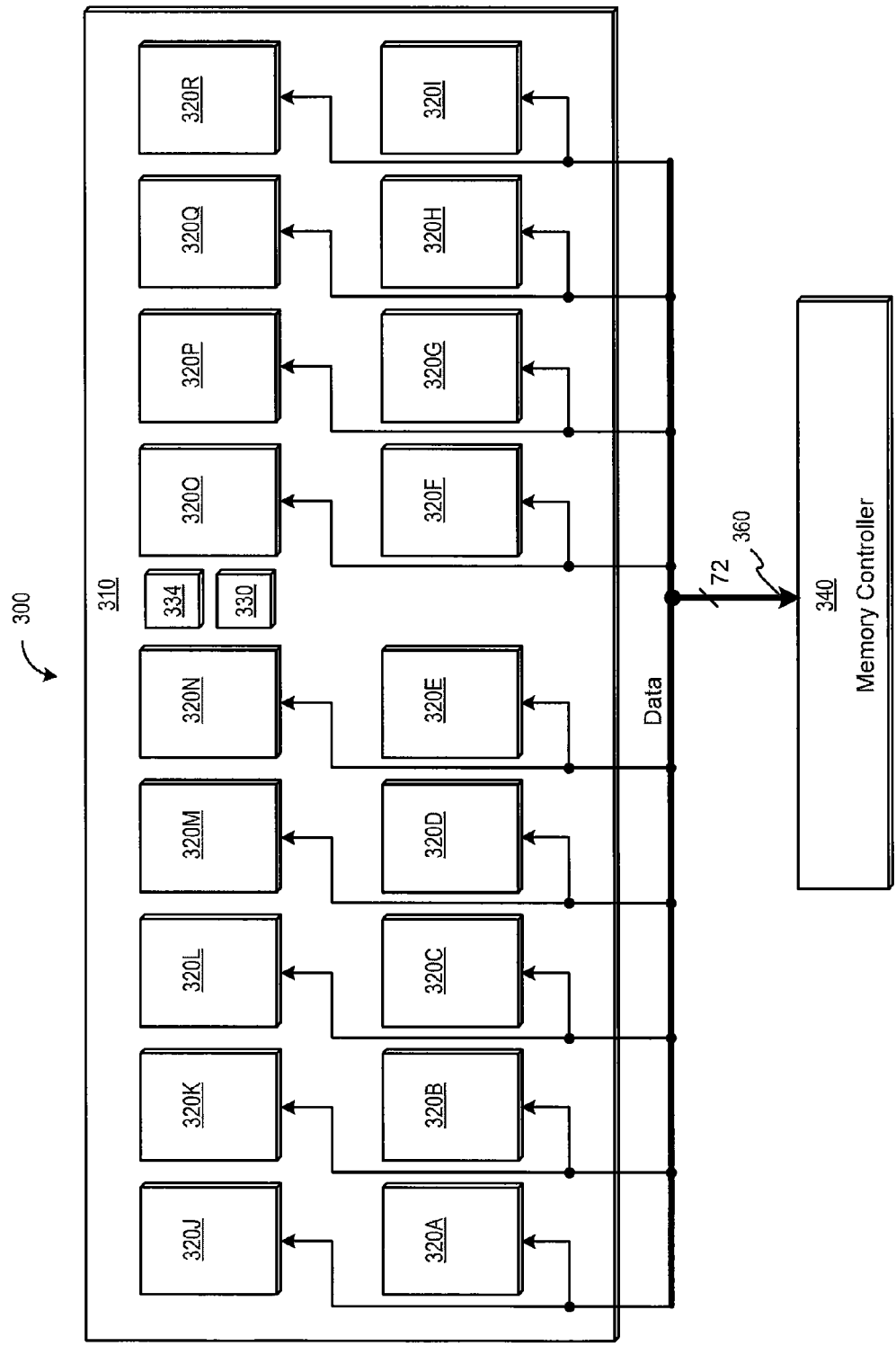
FIG. 3 illustrates a memory subsystem, one component of which is a dual-rank registered memory module that uses ×8 memory circuits, according to prior art.

FIG. 3 illustrates some of the major components of a memory subsystem 300, according to prior art. As shown, the memory subsystem 300 includes a memory controller 340 and a dual-rank memory module 310 interconnected via a memory bus that includes a data bus 360. As shown, the memory module 310 is composed of a first rank of ×8 memory devices 320A-I, a second rank of ×8 memory devices 320J-R, an interface circuit 330 that performs the address and control register function, and a non-volatile memory circuit 334 (e.g. EEPROM) that includes information about the configuration and capabilities of memory module 310. For ease of illustration, the address and control bus interconnecting the memory controller 340 and the interface circuit 330 as well as the address and control bus interconnecting the interface circuit 330 and the memory circuits 320A-R are not shown. It should be noted that the memory circuits may be transposed on the memory module in many different ways. For example, the first rank of memory circuits 320A-I may be placed on one side of the module while the second rank of memory circuits 320J-R may be placed on the other side of the module. Alternately, some subset of the memory circuits of both the ranks may be placed on one side of the memory module while the remaining memory circuits of the two ranks may be on the other side of the memory module. As shown, the two ranks of memory devices on the memory module 310 share the data bus 360. To illustrate, memory circuit 320A corresponds to data bits [7:0] of the first rank while memory circuit 320J corresponds to data bits [7:0] of the second rank. As a result, the data pins of memory circuits 320A and 320J are connected to the signal lines corresponding to data bits [7:0] of the data bus 360. In other words, the first and second rank of memory devices are said to have a shared or 'dotted' data bus. A dual-rank memory module composed of ×4 memory circuits would look similar to memory module 310 except that each rank would have eighteen ×4 memory circuits.

Figure 4:
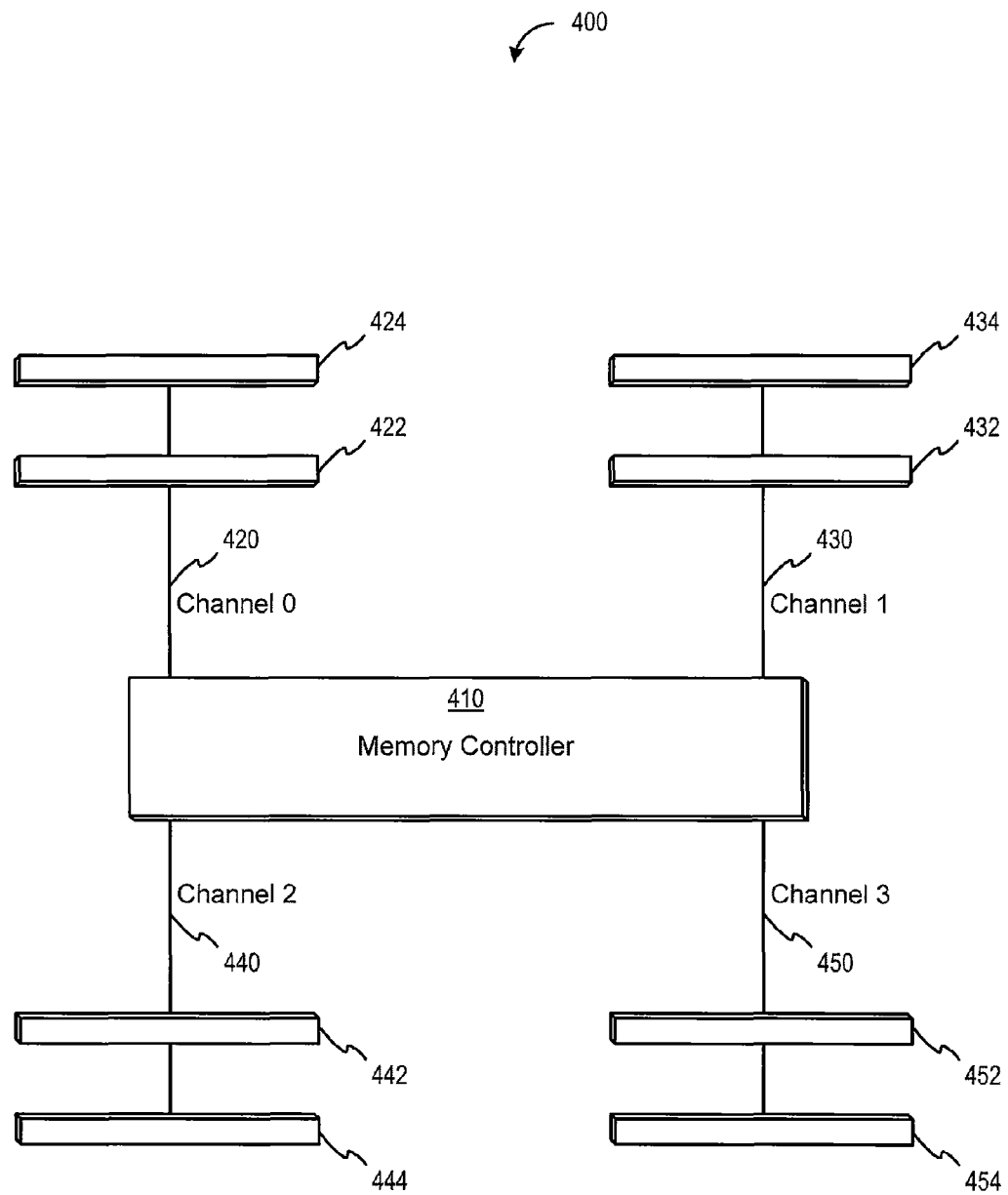
FIG. 4 illustrates a memory subsystem that includes a memory controller with four memory channels and two memory modules per channel, according to prior art.

FIG. 4 illustrates a four channel (i.e. four memory bus) memory subsystem 400, according to prior art. As shown, the memory subsystem 400 includes a memory controller 410 and four memory channels 420, 430, 440, and 450. Furthermore, as illustrated, each memory channel supports up to two memory modules. For example, memory channel 420 supports memory modules 422 and 424. Similarly, memory channel 430 supports memory modules 432 and 434, memory channel 440 supports memory modules 442 and 444, and memory channel 450 supports memory modules 452 and 454. The memory modules can be single-rank, dual-rank, or quad-rank modules. Furthermore, the memory modules on each channel share a common memory bus. Therefore, the memory controller 410 inserts idle cycles on the bus when switching from accessing one rank on a given channel to accessing a different rank on the same channel. For example, the memory controller 410 inserts one or more idle cycles on memory bus 420 when switching from accessing a first rank (not shown) on memory module 422 to accessing a second rank (not shown) on memory module 422. The idle bus cycle (s) or bus turnaround time needed when switching from accessing a first rank on a DIMM to accessing a second rank on the same DIMM is commonly referred to as the intra-DIMM rank-rank turnaround time. Furthermore, the memory controller 410 inserts one or more idle bus cycles on memory bus 420 when switching from accessing a rank (of memory circuits) on memory module 422 to accessing a rank on memory module 424. The idle bus cycle(s) or bus turnaround time needed when switching from accessing a rank on a first DIMM of a memory channel to accessing a rank on a second DIMM of the same memory channel is commonly referred to as the inter-DIMM rank-rank turnaround time. The intra-DIMM rank-rank turnaround time and the inter-DIMM rank-rank turnaround time may be the same or may be different. As can be seen from FIG. 4, these turnaround times are needed because all the ranks on a given memory channel share a common memory bus. These turnaround times have an appreciable impact on the maximum sustained bandwidth of the memory subsystem 400.

Typical memory controllers support modules with ×4 memory circuits and modules with ×8 memory circuits. As described previously, Chipkill requires eighteen memory circuits to be operated in parallel. Since a memory module with ×4 memory circuits has eighteen memory circuits per rank, the memory channels 420, 430, 440, and 450 may be operated independently when memory modules with ×4 memory circuits are used in memory subsystem 400. This mode of operation is commonly referred to as independent channel mode. However, memory modules with ×8 memory circuits have only nine memory circuits per rank. As a result, when such memory modules are used in memory subsystem 400, two memory channels are typically operated in parallel to provide Chipkill capability. To illustrate, say that all memory modules in memory subsystem 400 are modules with ×8 memory circuits. Since eighteen memory circuits must respond in parallel to a memory read or memory write to provide Chipkill capability, the memory controller 410 may issue a same read command to a first rank on memory module 422 and to a first rank on memory module 442. This ensures that eighteen memory circuits (nine on module 422 and nine on module 442) respond in parallel to the memory read. Similarly, the memory controller 410 may issue a same write command to a first rank on module 422 and a first rank on module 442. This method of operating two channels in parallel is commonly referred to as lockstep or ganged channel mode. One drawback of the lockstep mode is that in modern memory subsystems, the amount of data returned by the two memory modules in response to a read command may be greater than the amount of data needed by the memory controller. Similarly, the amount of data required by the two memory modules in association with a write command may be greater than the amount of data provided by the memory controller. For example, in a DDR3 memory subsystem, the minimum amount of data that will be returned by the target memory modules in the two channels operating in lockstep mode in response to a read command is 128 bytes (64 bytes from each channel). However, the memory controller typically only requires 64 bytes of data to be returned in response to a read command. In order to match the data requirements of the memory controller, modern memory circuits (e.g. DDR3 SDRAMs) have a burst chop capability that allows the memory circuits to connect to the memory bus for only half of the time when responding to a read or write command and disconnect from the memory bus during the other half. During the time the memory circuits are disconnected from the memory bus, they are unavailable for use by the memory controller. Instead, the memory controller may switch to accessing another rank on the same memory bus.

Figure 5:
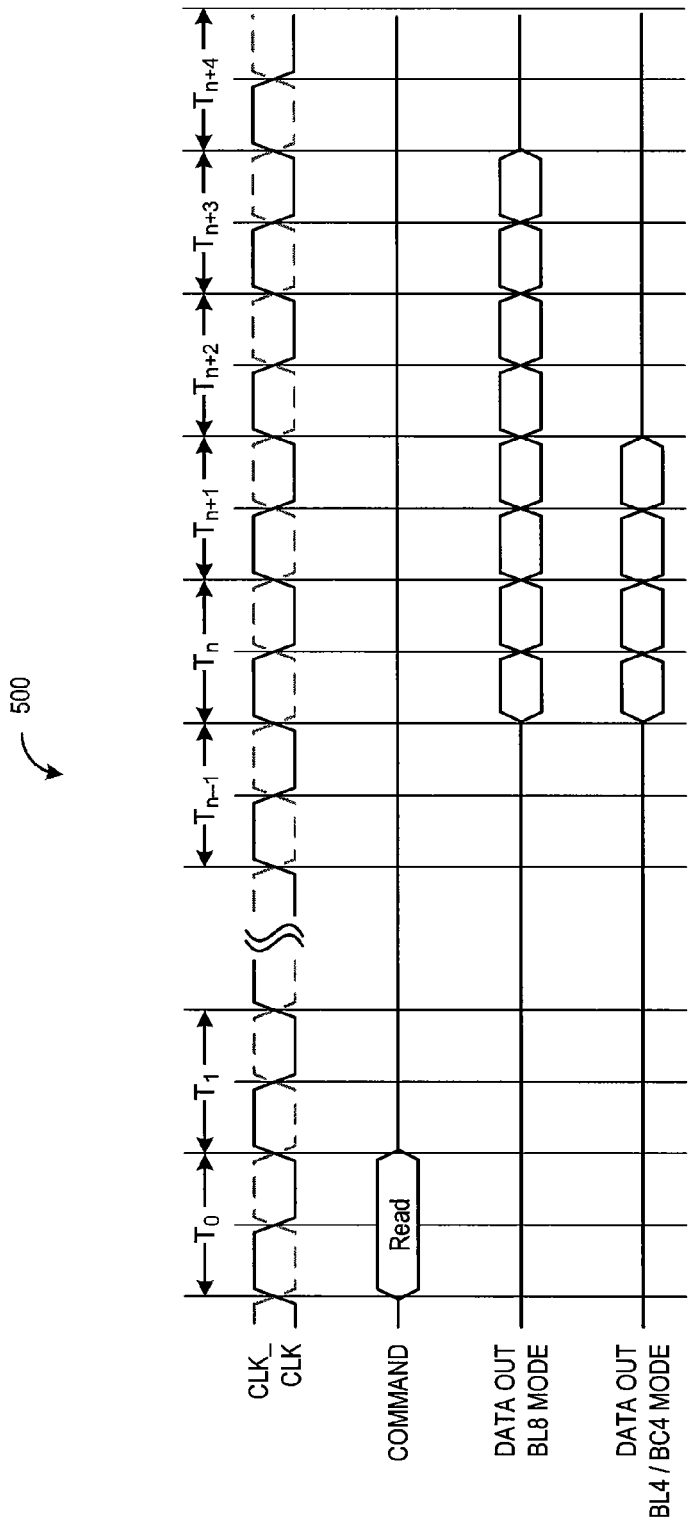
FIG. 5 illustrates a timing diagram of a burst length of 8 (BL8) read to a rank of memory circuits on a memory module and that of a burst length or burst chop of 4 (BL4 or BC4) read to a rank of memory circuits on a memory module.

FIG. 5 illustrates an example timing diagram 500 of a modern memory circuit (e.g. DDR3 SDRAM) operating in normal mode and in burst chop mode. As shown, a rank of memory circuits receives a read command from the memory controller in clock cycle $T_0$. In the normal mode of operation, the memory circuits respond by driving eight bits of data on each data line during clock cycles $T_n$ through $T_{n+3}$. This mode is also referred to as BL8 mode (burst length of 8). However, in the burst chop mode, the memory circuits receive a read command from the memory controller in clock cycle $T_0$ and respond by driving only four bits of data on each data line during clock cycles $T_n$ and $T_{n+1}$. The memory circuits disconnect from the memory bus during clock cycles $T_{n+2}$ and $T_{n+3}$. This mode is referred to as BL4 or BC4 (burst length of 4 or burst chop of 4) mode. The earliest time the same memory circuits can re-connect to the memory bus for a following read or write operation is clock cycle $T_{n+4}$.

Figure 6:
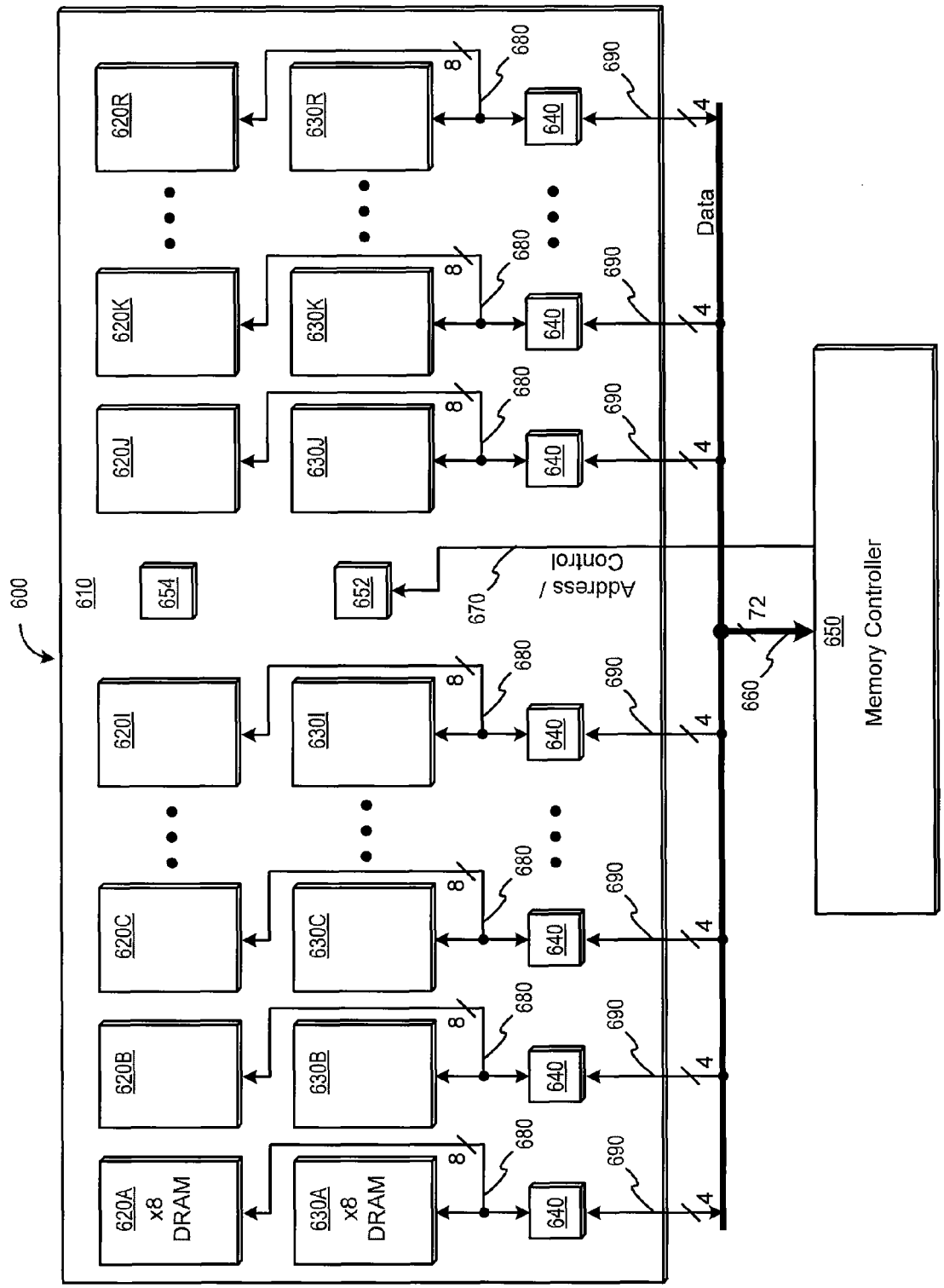
FIG. 6 illustrates a memory subsystem, one component of which is a memory module with a plurality of memory circuits and one or more interface circuits, according to one embodiment of the present invention.

FIG. 6 illustrates some of the major components of a memory subsystem 600, according to one embodiment of the present invention. As shown, the memory subsystem 600 includes a memory controller 650 and a memory module 610 interconnected via a memory bus that includes a data bus 660 and an address and control bus 670. As shown, the memory module 610 is composed of thirty six ×8 memory circuits 620A-R and 630A-R, one or more interface circuits 640, an interface circuit 652 that performs the address and control register function, and a non-volatile memory circuit 654 (e.g. EEPROM) that includes information about the configuration and capabilities of memory module 610. For the purpose of illustration, eighteen interface circuits 640 are shown, each of which has an 8-bit wide data bus 680 that connects to the corresponding two memory circuits and a 4-bit wide data bus 690 that connects to the data bus 660 of the memory bus. It should be noted that the functions of all the interface circuits 640 and optionally, that of the interface circuit 652, may be implemented in a single integrated circuit or in multiple integrated circuits. It should also be noted that the memory circuits 620A-R and 630A-R may be transposed in many different ways on the memory module. For example, the memory circuits 620A-R may all be on one side of the memory module whereas the memory circuits 630A-R may all be on the other side of the module. Alternately, some subset of the memory circuits 620A-R and some subset of the memory circuits 630A-R may be on one side of the memory module while the remaining memory circuits are on the other side of the module. In yet another implementation, two memory circuits that have a common data bus to the corresponding interface circuit (e.g. memory circuit 620A and memory circuit 630A) may be in a dual-die package (DDP) and thus, share a common package.

Memory module 610 may be configured as a memory module with four ranks of ×8 memory circuits (i.e. quad-rank memory module with ×8 memory circuits), as a memory module with two ranks of ×8 memory circuits (i.e. dual-rank memory module with ×8 memory circuits), as a memory module with two ranks of ×4 memory circuits (i.e. dual-rank memory module with ×4 memory circuits), or as a memory module with one rank of ×4 memory circuits (i.e. single-rank memory module with ×4 memory circuits).

FIG. 6 illustrates memory module 610 configured as a dual-rank memory module with ×4 memory circuits. In other words, the thirty six ×8 memory circuits are configured into a first rank of eighteen memory circuits 620A-R and a second rank of eighteen memory circuits 630A-R. It can be seen from the figure that the interface circuits 640 collectively have a 72-bit wide data interface 690 to the memory controller 650 and a 144-bit wide data interface 680 to the ranks of memory circuits on the memory module 610. When the memory controller 650 issues a BL8 access, say a read, to the first rank of memory circuits (i.e. memory circuits 620A-R), the interface circuits 640 performs a BL4 read access to memory circuits of that rank. This ensures that memory circuits 620A-R release the shared data bus 680 between the interface circuits 640 and the ranks after two clock cycles (instead of driving the shared data bus for four clock cycles for a BL8 access).

Figure 7:
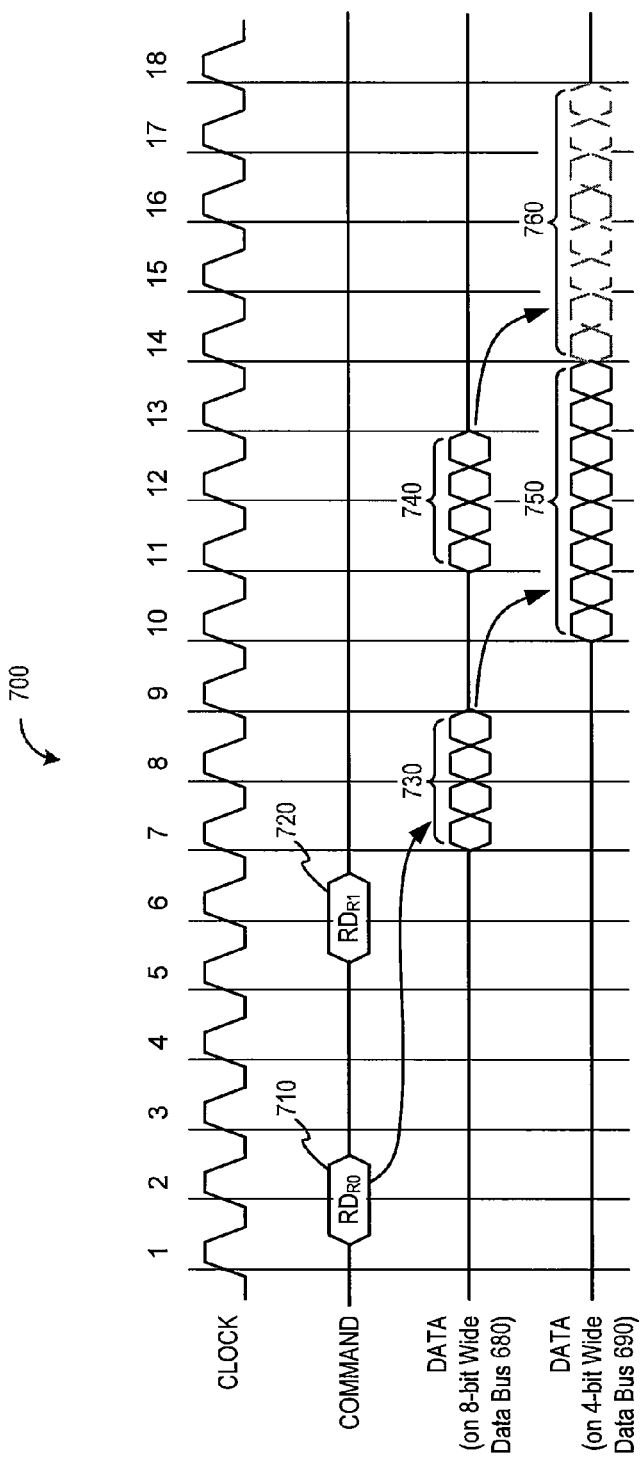
FIG. 7 illustrates a timing diagram of a read to a first rank on a memory module followed by a read to a second rank on the same memory module, according to an embodiment of the present invention.

FIG. 7 shows an example timing diagram 700 of a read to the first rank of memory circuits 620A-R followed by a read to the second rank of memory circuits 630A-R when memory module 610 is configured as a dual-rank module with ×4 memory circuits, according to an embodiment of this invention. The memory controller 650 issues a BL8 read command (not shown) to the first rank of memory circuits 620A-R. This is converted to a BL4 read command 710 by one or more of the interface circuits 640 and 652 and sent to memory circuits 620A-R. Each of the memory circuits 620A-R returns the requested data 730 as four bytes in two clock cycles on data bus 680. This data is received by interface circuit 640 and re-transmitted to the memory controller 650 as eight nibbles (i.e. as BL8 data on the 4-bit wide bus 690) of data 750. In other words, each of the memory circuits 620A-R outputs four bytes of data 730 to interface circuit 640 which, in turn, sends the data as eight nibbles 750 to the memory controller. As shown in FIG. 7, the memory circuits 620A-R connect to the data bus 680 for two clock cycles and then disconnect from the data bus 680. This gives memory circuits 630A-R sufficient time to connect to data bus 680 and be ready to respond to a read command exactly four clock cycles after a read command was issued to memory circuits 620A-R. Thus, when memory module 610 is configured as a dual-rank module with ×4 memory circuits (i.e. when a ×4 memory circuit is emulated using a ×8 memory circuit), memory subsystem 600 may operate with a 0-cycle (zero cycle) intra-DIMM rank-rank turnaround time for reads. In other words, the memory controller does not need to ensure idle bus cycles on data bus 660 while performing successive and continuous or contiguous read operations to the different ranks of memory circuits on memory module 610. The read command to memory circuits 630A-R, the data from each of the memory circuits 630A-R, and the corresponding data re-transmitted by interface circuit 640 to the memory controller 650 are labeled 720, 740, and 760 respectively in FIG. 7.

Figure 8:
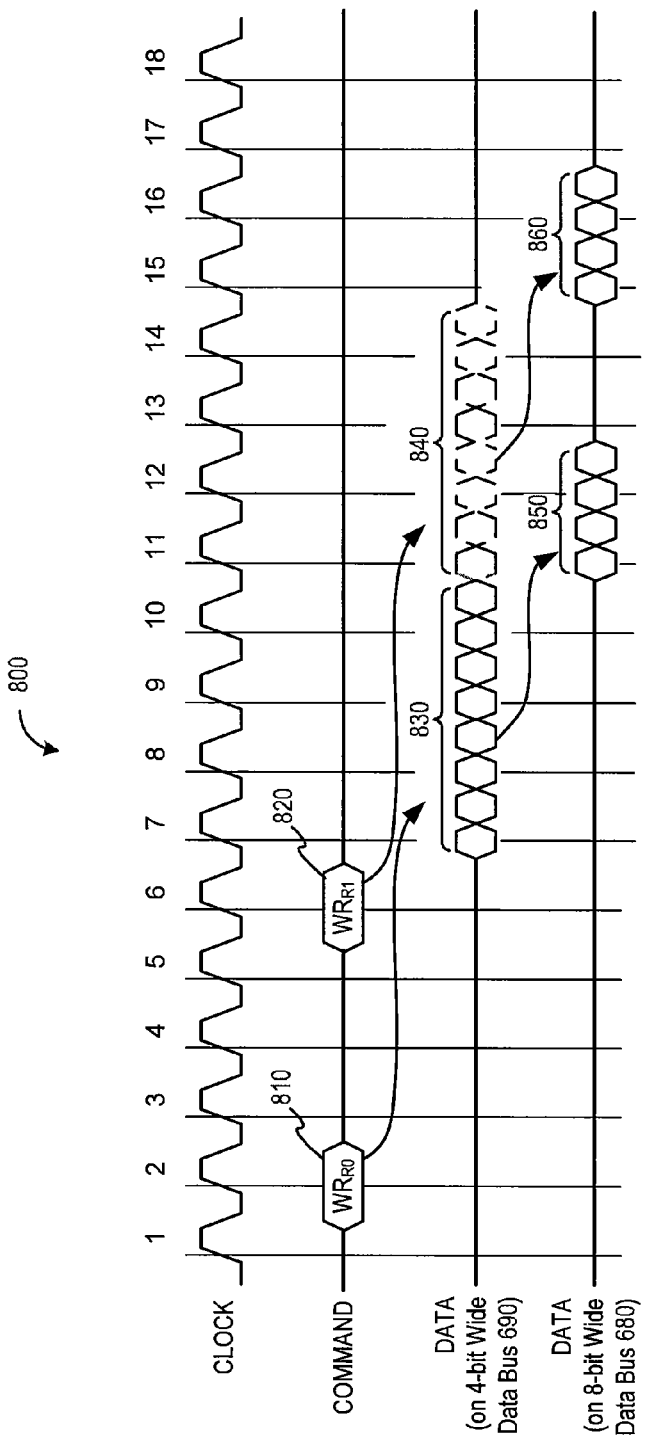
FIG. 8 illustrates a timing diagram of a write to a first rank on a memory module followed by a write to a second rank on the same module, according to an embodiment of the present invention.

FIG. 8 shows an example timing diagram 800 of a write to the first rank of memory circuits 620A-R followed by a write to the second rank of memory circuits 630A-R when memory module 610 is configured as a dual-rank module with ×4 memory circuits, according to an embodiment of this invention. The memory controller 650 issues a BL8 write command (not shown) to the first rank of memory circuits 620A-R. This is converted to a BL4 write command 810 by one or more of the interface circuits 640 and 652 and sent to memory circuits 620A-R. Interface circuit 640 receives write data 830 from the memory controller 650 as eight nibbles (i.e. as BL8 data on the 4-bit wide data bus 690). Interface circuit 640 then sends the write data to memory circuits 620A-R as four bytes 850 (i.e. as BL4 data on the 8-bit wide data bus 680). As shown in the figure, the memory circuits 620A-R connect to the data bus 680 for two clock cycles and then disconnect from the data bus 680. This gives memory circuits 630A-R sufficient time to connect to data bus 680 and be ready to accept a write command exactly four clock cycles after a write command was issued to memory circuits 620A-R. Thus, when memory module 610 is configured as a dual-rank module with ×4 memory circuits (i.e. when a ×4 memory circuit is emulated using a ×8 memory circuit), memory subsystem 600 may operate with a 0-cycle intra-DIMM rank-rank turnaround time for writes. In other words, the memory controller does not need to insert idle bus cycles on data bus 660 while performing successive and continuous or contiguous write operations to the different ranks of memory circuits on memory module 610. The write command to memory circuits 630A-R, the data received by interface circuit 640 from memory controller 650, and the corresponding data re-transmitted by interface circuit 640 to memory circuits 630A-R are labeled 820, 840, and 860 respectively in FIG. 8.

Memory module 610 that is configured as a dual-rank memory module with ×4 memory circuits as described above provides higher reliability (by supporting ChipKill) and higher performance (by supporting 0-cycle intra-DIMM rank-rank turnaround times).

Memory module 610 may also be configured as a single-rank memory module with ×4 memory circuits. In this configuration, two memory circuits that have a common data bus to the corresponding interface circuits (e.g. 620A and 630A) are configured by one or more of the interface circuits 640 and 652 to emulate a single ×4 memory circuit with twice the capacity of each of the memory circuits 620A-R and 630A-R. For example, if each of the memory circuits 620A-R and 630A-R is a 1 Gb, ×8 DRAM, then memory module 610 is configured as a single-rank 4 GB memory module with 2 Gb×4 memory circuits (i.e. memory circuits 620A and 630A emulate a single 2 Gb×4 DRAM). This configuration provides higher reliability (by supporting ChipKill).

Memory module 610 may also be configured as quad-rank memory module with ×8 memory circuits. In this configuration, memory circuits 620A, 620C, 620E, 620G, 620I, 620K, 620M, 620O, and 620Q may be configured as a first rank of 8 memory circuits; memory circuits 620B, 620D, 620F, 620H, 620J, 620L, 620N, 620P, and 620R may be configured as a second rank of ×8 memory circuits; memory circuits 630A, 630C, 630E, 630G, 630I, 630K, 630M, 630O, and 630Q may be configured as a third rank of ×8 memory circuits; and memory circuits 630B, 630D, 630F, 630H, 630J, 630L, 630N, 630P, and 630R may be configured as fourth rank of ×8 memory circuits. This configuration requires the functions of interface circuits 640 and optionally that of 652 to be implemented in nine or fewer integrated circuits. In other words, each interface circuit 640 must have at least two 8-bit wide data buses 680 that connect to the corresponding memory circuits of all four ranks (e.g. 620A, 620B, 630A, and 630B) and at least an 8-bit wide data bus 690 that connects to the data bus 660 of the memory bus. This is a lower power configuration since only nine memory circuits respond in parallel to a command from the memory controller. In this configuration, interface circuit 640 has two separate data buses 680, each of which connects to corresponding memory circuits of two ranks. In other words, memory circuits of a first and third rank (i.e. first set of ranks) share one common data bus to the corresponding interface circuit while memory circuits of a second and fourth rank (i.e. second set of ranks) share another common data bus to the corresponding interface circuit. Interface circuit 640 may be designed such that when memory module 610 is configured as a quad-rank module with ×8 memory circuits, memory system 600 may operate with 0-cycle rank-rank turnaround times for reads or writes to different sets of ranks but operate with a non-zero-cycle rank-rank turnaround times for reads or writes to ranks of the same set. Alternately, interface circuit may be designed such that when memory module 610 is configured as a quad-rank module with ×8 memory circuits, memory system 600 operates with non-zero-cycle rank-rank turnaround times for reads or writes to any of the ranks of memory module 610.

Memory module 610 may also be configured as a dual-rank memory module with ×8 memory circuits. This configuration requires the functions of interface circuits 640 and optionally that of 652 to be implemented in nine or fewer integrated circuits. In other words, each interface circuit 640 must have at least two 8-bit wide data buses 680 that connect to the corresponding memory circuits of all four ranks (e.g. 620A, 620B, 630A, and 630B) and at least an 8-bit wide data bus 690 that connects to the data bus 660 of the memory bus. In this configuration, two memory circuits that have separate data buses to the corresponding interface circuit (e.g. 620A and 620B) are configured by one or more of the interface circuits 640 and 652 to emulate a single ×8 memory circuit with twice the capacity of each of the memory circuits 620A-R and 630A-R. For example, if each of the memory circuits 620A-R and 630A-R is a 1 Gb, ×8 DRAM, then memory module 610 may be configured as a dual-rank 4 GB memory module with 2 Gb×8 memory circuits (i.e. memory circuits 620A and 620B emulate a single 2 Gb×8 DRAM). This configuration is a lower power configuration since only nine memory circuits respond in parallel to a command from the memory controller.

Figure 9:
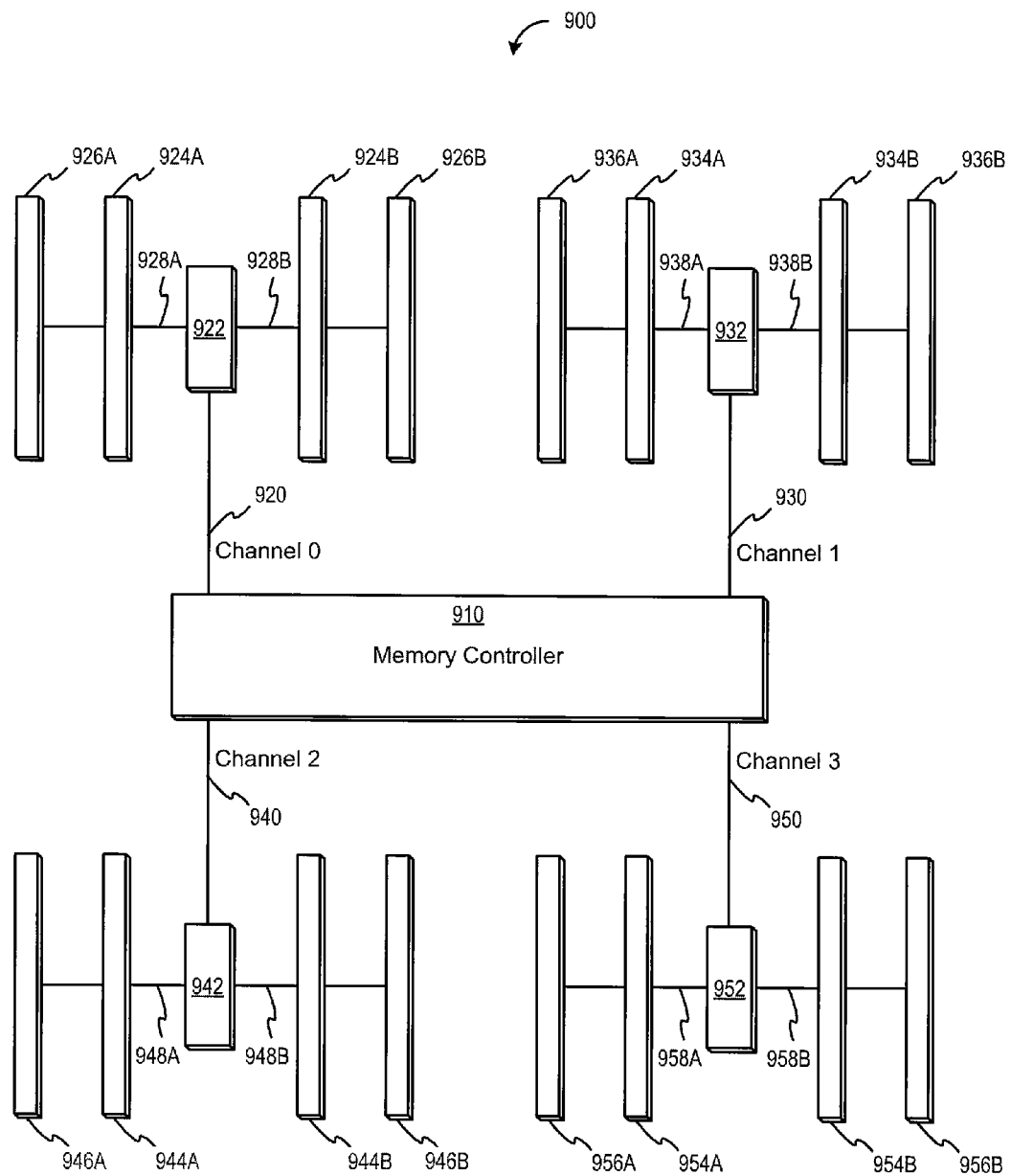
FIG. 9 illustrates a memory subsystem that includes a memory controller with four memory channels, where each channel includes one or more interface circuits and four memory modules, according to another embodiment of the present invention.

FIG. 9 illustrates a four channel memory subsystem 900, according to another embodiment of the present invention. As shown, the memory subsystem 900 includes a memory controller 910 and four memory channels 920, 930, 940, and 950. Furthermore, as illustrated, each memory channel has one interface circuit and supports up to four memory modules. For example, memory channel 920 has one interface circuit 922 and supports up to four memory modules 924A, 924B, 926A, and 926B. Similarly, memory channel 930 has one interface circuit 932 and supports up to four memory modules 934A, 934B, 936A, and 936B; memory channel 940 has one interface circuit 942 and supports up to four memory modules 944A, 944B, 946A, and 946B; and memory channel 950 has one interface circuit 952 and supports up to four memory modules 954A, 954B, 956A, and 956B. It should be noted that the function performed by each of the interface circuits 922, 932, 942, and 952 may be implemented in one or more integrated circuits.

Interface circuit 922 has two separate memory buses 928A and 928B, each of which connects to two memory modules. Similarly, interface circuit 932 has two separate memory buses 938A and 938B, interface circuit 942 has two separate memory buses 948A and 948B, and interface circuit 952 has two separate memory buses 958A and 958B. The memory modules in memory subsystem 900 may use either ×4 memory circuits or ×8 memory circuits. As an option, the memory subsystem 900 including the memory controller 910 and the interface circuits 922, 932, 942, and 952 may be implemented in the context of the architecture and environment of FIGS. 6-8. Of course, the memory subsystem 900 including the memory controller 910 and the interface circuits 922, 932, 942, and 952 may be used in any desired environment. It should also be noted that the aforementioned definitions may apply during the present description.

If the memory modules in memory subsystem 900 use ×4 memory circuits, then interface circuit 922 may be configured to provide the memory controller with the ability to switch between a rank on memory bus 928A and a rank on memory bus 928B without needing any idle bus cycles on memory bus 920. However, one or more idle bus cycles are required on memory bus 920 when switching between a first rank on memory bus 928A and a second rank on memory bus 928A because these ranks share a common bus. The same is true for ranks on memory bus 928B. Interface circuits 932, 942, and 952 (and thus, memory buses 930, 940, and 950 respectively) may be configured similarly.

If the memory modules in memory subsystem 900 use ×8 memory circuits, then interface circuit 922 may be configured to emulate a rank of ×4 memory circuits using two ranks of ×8 memory circuits (one rank on memory bus 928A and one rank on memory bus 928B). This configuration provides the memory controller with the ability to switch between any of the ranks of memory circuits on memory buses 928A and 928B without any idle bus cycles on memory bus 920. Alternately, the interface circuit 922 may be configured to not do any emulation but instead present the ranks of ×8 memory circuits on the memory modules as ranks of ×8 memory circuits to the memory controller. In this configuration, the memory controller may switch between a rank on memory bus 928A and a rank on memory bus 928B without needing any idle bus cycles on memory bus 920 but require one or more idle bus cycles when switching between two ranks on memory bus 928A or between two ranks on memory bus 928B. Interface circuits 932, 942, and 952 (and thus, memory buses 930, 940, and 950 respectively) may be configured similarly.

Figure 10:
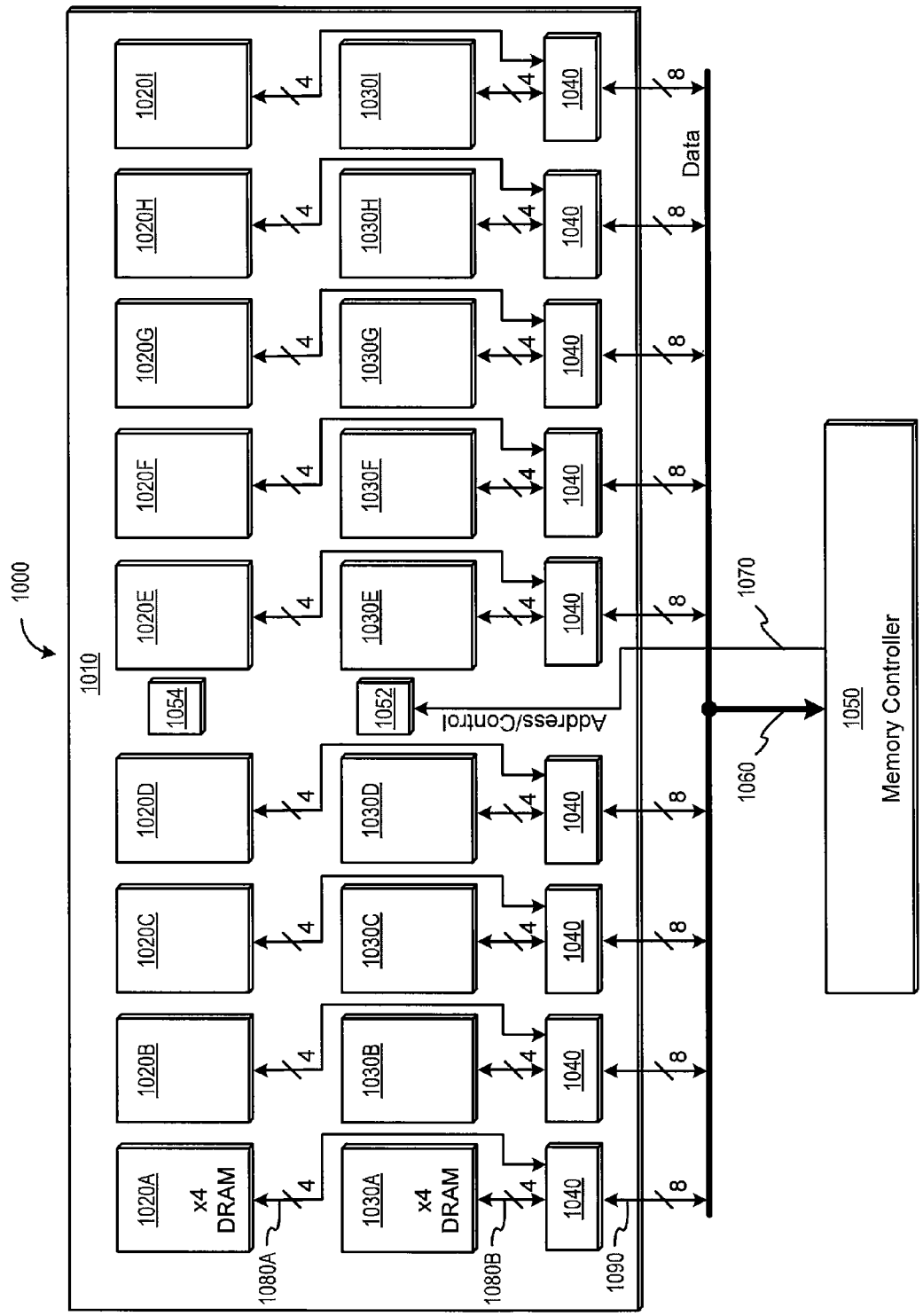
FIG. 10 illustrates a memory subsystem, one component of which is a memory module with a plurality of memory circuits and one or more interface circuits, according to yet another embodiment of the present invention.

FIG. 10 illustrates some of the major components of a memory subsystem 1000, according to yet another embodiment of the present invention. As shown, the memory subsystem 1000 includes a memory controller 1050 and a memory module 1010 interconnected via a memory bus that includes a data bus 1060 and an address and control bus 1070. As shown, the memory module 1010 is composed of eighteen ×4 memory circuits 1020A-I and 1030A-I, one or more interface circuits 1040, an interface circuit 1052 that performs the address and control register function, and a non-volatile memory circuit 1054 (e.g. EEPROM) that includes information about the configuration and capabilities of memory module 1010. For the purpose of illustration, nine interface circuits 1040 are shown, each of which has a 4-bit wide data bus 1080A that connects to a first memory circuit, a 4-bit wide data bus 1080B that connects to a second memory circuit, and an 8-bit wide data bus 1090 that connects to the data bus 1060 of the memory bus. It should be noted that the functions of all the interface circuits 1040 and optionally, that of the interface circuit 1052, may be implemented in a single integrated circuit or in multiple integrated circuits. It should also be noted that memory circuits 1020A-I and 1030A-I may be transposed in many different ways on the memory module. For example, the memory circuits 1020A-I may all be on one side of the memory module whereas the memory circuits 1030A-I may all be on the other side of the module. Alternately, some subset of the memory circuits 1020A-I and some subset of the memory circuits 1030A-I may be on one side of the memory module while the remaining memory circuits are on the other side of the module. In yet another implementation, the two memory circuits that connect to the same interface circuit (e.g. memory circuit 1020A and memory circuit 1030A) may be in a dual-die package (DDP) and thus, share a common package. As an option, the memory subsystem 1000 including the memory controller 1050 and interface circuits 1040 and 1052 may be implemented in the context of the architecture and environment of FIGS. 6-9. Of course, however, the memory subsystem 1000 including the memory controller 1050 and interface circuits 1040 and 1052 may be used in any desired environment. It should also be noted that the aforementioned definitions may apply during the present description.

Memory module 1010 may be configured as a memory module with one rank of ×4 memory circuits (i.e. single-rank memory module with ×4 memory circuits), as a memory module with two ranks of ×8 memory circuits (i.e. a dual-rank memory module with ×8 memory circuits), or as a memory module with a single rank of ×8 memory circuits (i.e. a single-rank memory module with ×8 memory circuits).

FIG. 10 illustrates memory module 1010 configured as a dual-rank memory module with ×8 memory circuits. In other words, the eighteen ×4 memory circuits are configured into a first rank of memory circuits 1020A-I and a second rank of memory circuits 1030A-I. It can be seen from the figure that, in this configuration, the interface circuits 1040 collectively have a 72-bit wide data interface 1090 to the memory controller 1050 and two 36-bit wide data interfaces, 1080A and 1080B, to the two ranks of memory circuits on the memory module 1010. Since the two ranks of memory circuits have independent data buses that connect them to the interface circuits 1040, the memory controller may operate them in a parallel or overlapped manner, preferably when BL4 accesses are used to read from and write to the memory circuits. That is, the memory controller 1050 may issue BL4 accesses (reads or writes) alternately to the first and second ranks of memory circuits without inserting or causing any idle bus cycles on the data bus 1060. The interface circuits 1040, and optionally 1052, issue corresponding BL8 accesses to the two ranks of memory circuits in an overlapped manner.

Figure 11:
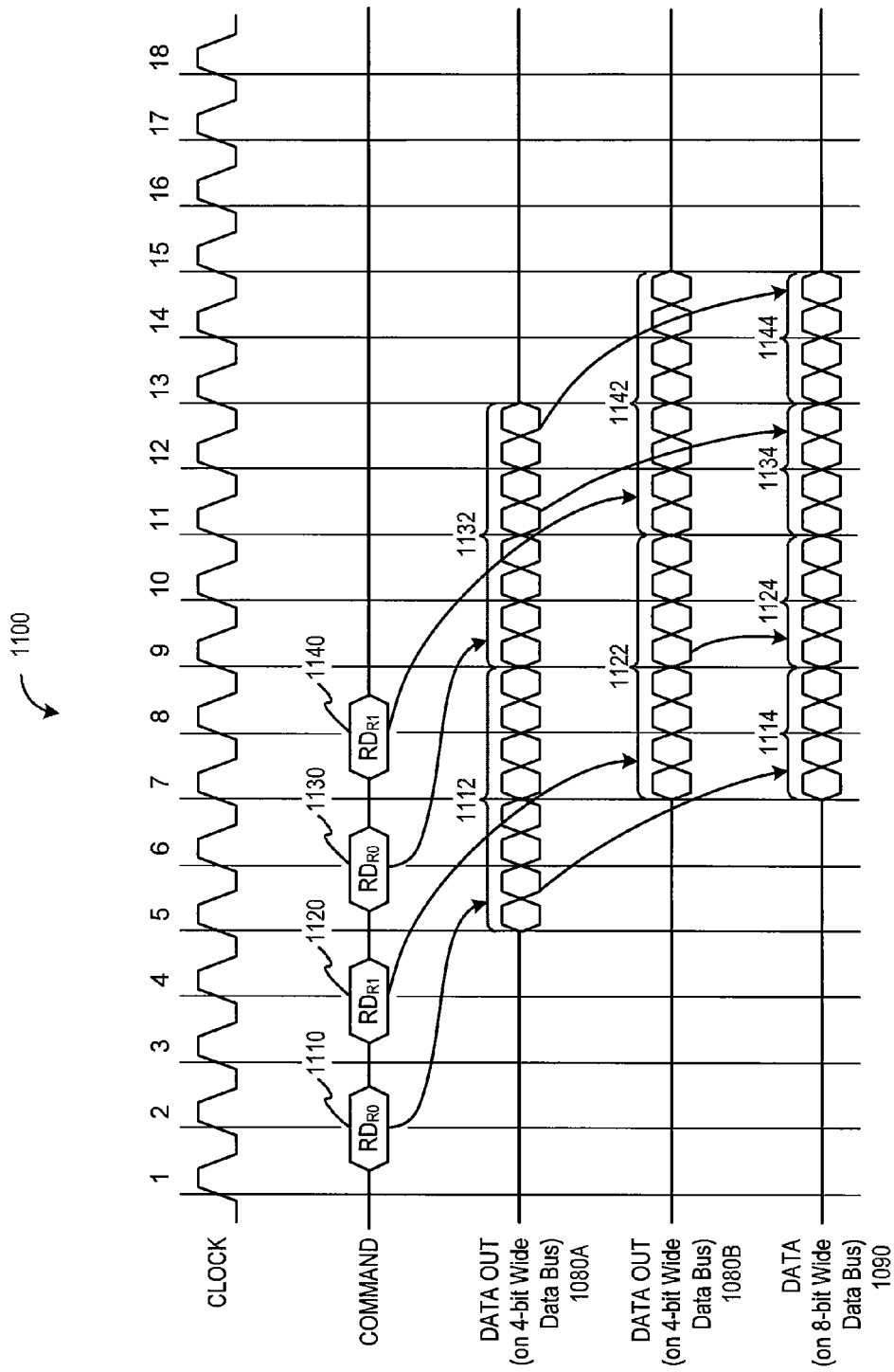
FIG. 11 shows an example timing diagram of reads to a first rank of memory circuits alternating with reads to a second rank of memory circuits, according to an embodiment of this invention.

FIG. 11 shows an example timing diagram 1100 of BL4 reads to the first rank of memory circuits 1020A-I alternating with BL4 reads to the second rank of memory circuits 1030A-I when memory module 1010 is configured as a dual-rank module with ×8 memory circuits, according to an embodiment of this invention. The memory controller 1050 issues a BL4 read command (not shown) to the first rank of memory circuits. This is converted to a BL8 read command 1110 by one or more of the interface circuits 1040 and 1052 and sent to the first rank of memory circuits 1020A-I. Each of the memory circuits 1020A-I returns the requested data 1112 as eight nibbles in four clock cycles on data bus 1080A. This data is received by interface circuit 1040 and re-transmitted to the memory controller 1050 as four bytes (i.e. as BL4 data on the 8-bit wide bus 1090) of data 1114. In other words, each of the memory circuits 1020A-I outputs eight nibbles of data 1112 to interface circuit 1040 which, in turn, sends the data as four bytes 1114 to the memory controller. Since the second rank of memory circuits 1030A-I are independently connected to the interface circuits 1040 by means of data buses 1080B, the memory controller may issue a BL4 read command (not shown) to the second rank of memory circuits exactly 2 clock cycles after issuing the BL4 read command to the first rank of memory circuits. The BL4 read command to the second rank is converted to a BL8 read command 1120 by one or more of the interface circuits 1040 and 1052 and sent to the second rank of memory circuits 1030A-I. Each of the memory circuits 1030A-I returns the requested data 1122 as eight nibbles in four clock cycles on data bus 1080B. This data is received by interface circuit 1040 and re-transmitted to the memory controller 1050 as four bytes of data 1124. As shown in this figure, there is no idle bus cycle on data bus 1090 (and hence, on data bus 1060) between read data 1114 from the first rank of memory circuits and read data 1124 from the second rank of memory circuits. Subsequent BL4 read commands may be issued in an alternating manner to the two ranks of memory circuits without the memory controller 1050 inserting or causing any idle bus cycles on data bus 1090 (and hence, on data bus 1060). Thus, when memory module 1010 is configured as dual-rank module with ×8 memory circuits (i.e. when a ×8 memory circuit is emulated using a ×4 memory circuit), memory subsystem 1000 may operate with a 0-cycle (zero cycle) intra-DIMM rank-rank turnaround time for BL4 reads. In other words, the memory controller does not need to ensure idle bus cycles on data bus 1060 while performing alternating and continuous or contiguous BL4 read operations to the different ranks of memory circuits on memory module 1010. It should be noted that idle bus cycles will be needed between successive and continuous or contiguous BL4 reads to the same rank of memory circuits in this configuration.

Figure 12:
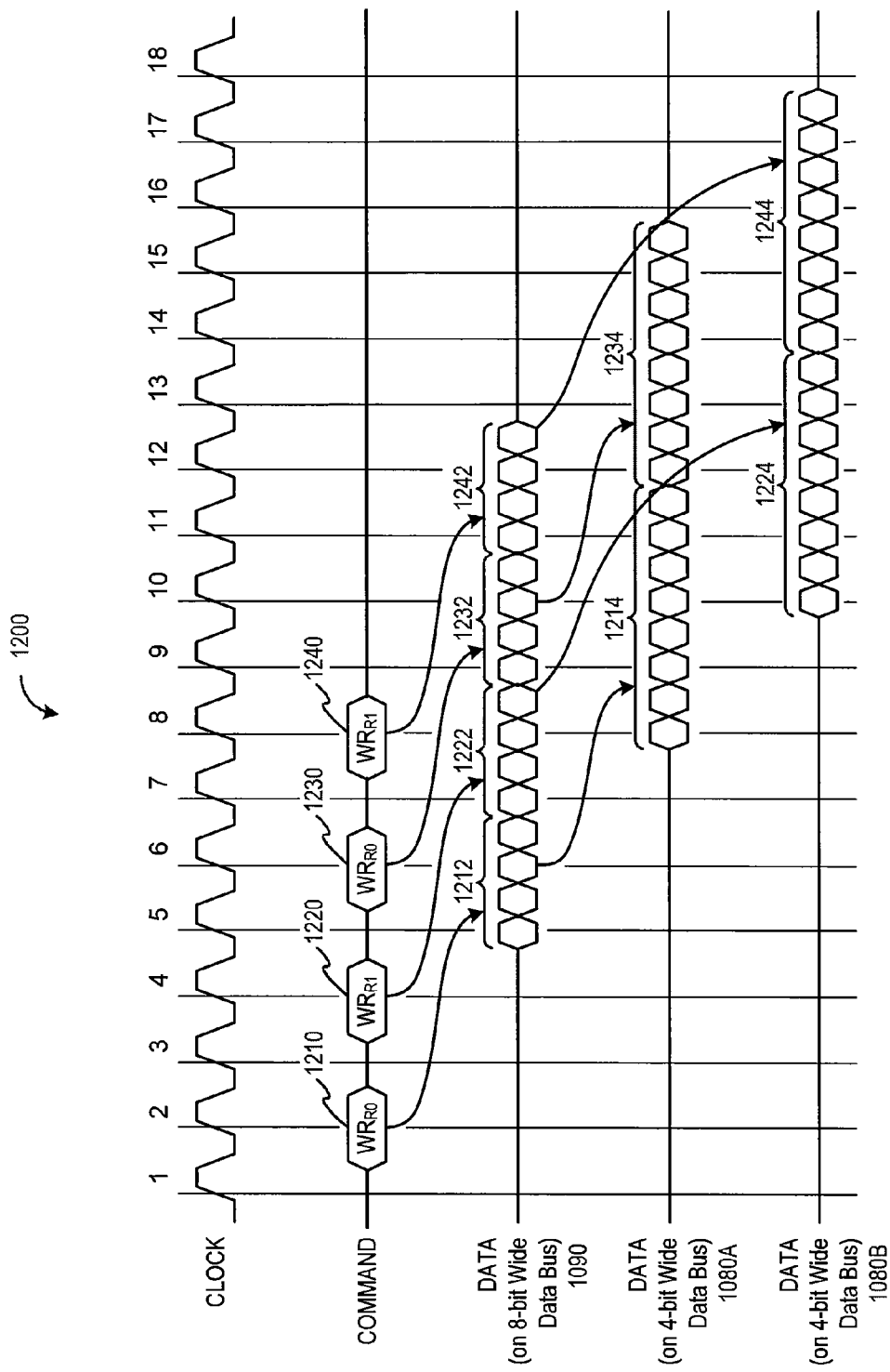
FIG. 12 shows an example timing diagram of writes to a first rank of memory circuits alternating with writes to a second rank of memory circuits, according to an embodiment of this invention.

FIG. 12 shows an example timing diagram 1200 of BL4 writes to the first rank of memory circuits 1020A-I alternating with BL4 writes to the second rank of memory circuits 1030A-I when memory module 1010 is configured as a dual-rank module with ×8 memory circuits, according to an embodiment of this invention. The memory controller 1050 issues a BL4 write command (not shown) to the first rank of memory circuits. This is converted to a BL8 write command 1210 by one or more of the interface circuits 1040 and 1052 and sent to the first rank of memory circuits 1020A-I. Interface circuit 1040 receives write data 1212 from the memory controller 1050 as four bytes (i.e. as BL4 data on the 8-bit wide data bus 1090). Interface circuit 1040 then sends the write data to memory circuits 1020A-I as eight nibbles 1214 (i.e. as BL8 data on the 4-bit wide data bus 1080A). Since the second rank of memory circuits 1030A-I are independently connected to interface circuits 1040 by means of data buses 1080B, the memory controller may issue a BL4 write command (not shown) to the second rank of memory circuits exactly 2 clock cycles after issuing the BL4 write command to the first rank of memory circuits. The BL4 write command to the second rank is converted to a BL8 write command 1220 by one or more of the interface circuits 1040 and 1052 and send to the second rank of memory circuits 1030A-I. Interface circuit 1040 receives write data 1222 from the memory controller 1050 as four bytes (i.e. as BL4 data on the 8-bit wide data bus 1090) and sends the write data to memory circuits 1030A-I as eight nibbles 1224 (i.e. as BL8 data on the 4-bit wide data bus 1080B). As shown in this figure, there is no need for the memory controller to insert one or more idle bus cycles between write data 1212 to the first rank of memory circuits and write data 1222 to the second rank of memory circuits. Subsequent BL4 write commands to the two ranks of memory circuits may be issued in an alternating manner without any idle bus cycles on data bus 1060 (and hence, on data bus 1090). Thus, when memory module 1010 is configured as dual-rank module with ×8 memory circuits (i.e. when a ×8 memory circuit is emulated using a ×4 memory circuit), memory subsystem 1000 may operate with a 0-cycle (zero cycle) intra-DIMM rank-rank turnaround time for BL4 writes. In other words, the memory controller does not need to ensure idle bus cycles on data bus 1060 (and hence, on data bus 1090) while performing alternating and continuous or contiguous BL4 write operations to the different ranks of memory circuits on memory module 1010. It should be noted that idle bus cycles may be needed between successive and continuous or contiguous BL4 writes to the same rank of memory circuits in this configuration.

Memory module 1010 that is configured as a dual-rank memory module with ×8 memory circuits as described above provides higher performance (by supporting 0-cycle intra-DIMM rank-rank turnaround times) without significant increase in power (since nine memory circuits respond to each command from the memory controller).

Memory module 1010 may also be configured as a single-rank memory module with ×4 memory circuits. In this configuration, all the memory circuits 1020A-I and 1030A-I are made to respond in parallel to each command from the memory controller. This configuration provides higher reliability (by supporting ChipKill).

Memory module 1010 may also be configured as a single-rank memory module with ×8 memory circuits. In this configuration, two memory circuits that have separate data buses to the corresponding interface circuit (e.g. 1020A and 1030A) are configured by one or more of the interface circuits 1040 and 1052 to emulate a single ×8 memory circuit with twice the capacity of each of the memory circuits 1020A-I and 1030A-

I. For example, if each of the memory circuits 1020A-I and 1030A-I is a 1 Gb, ×4 DRAM, then memory module 1010 may be configured as a single-rank 2 GB memory module composed of 2 Gb×8 memory circuits (i.e. memory circuits 1020A and 1030B emulate a single 2 Gb×8 DRAM). This configuration is a lower power configuration. It should be noted that this configuration preferably requires BL4 accesses by the memory controller.

Figure 13:
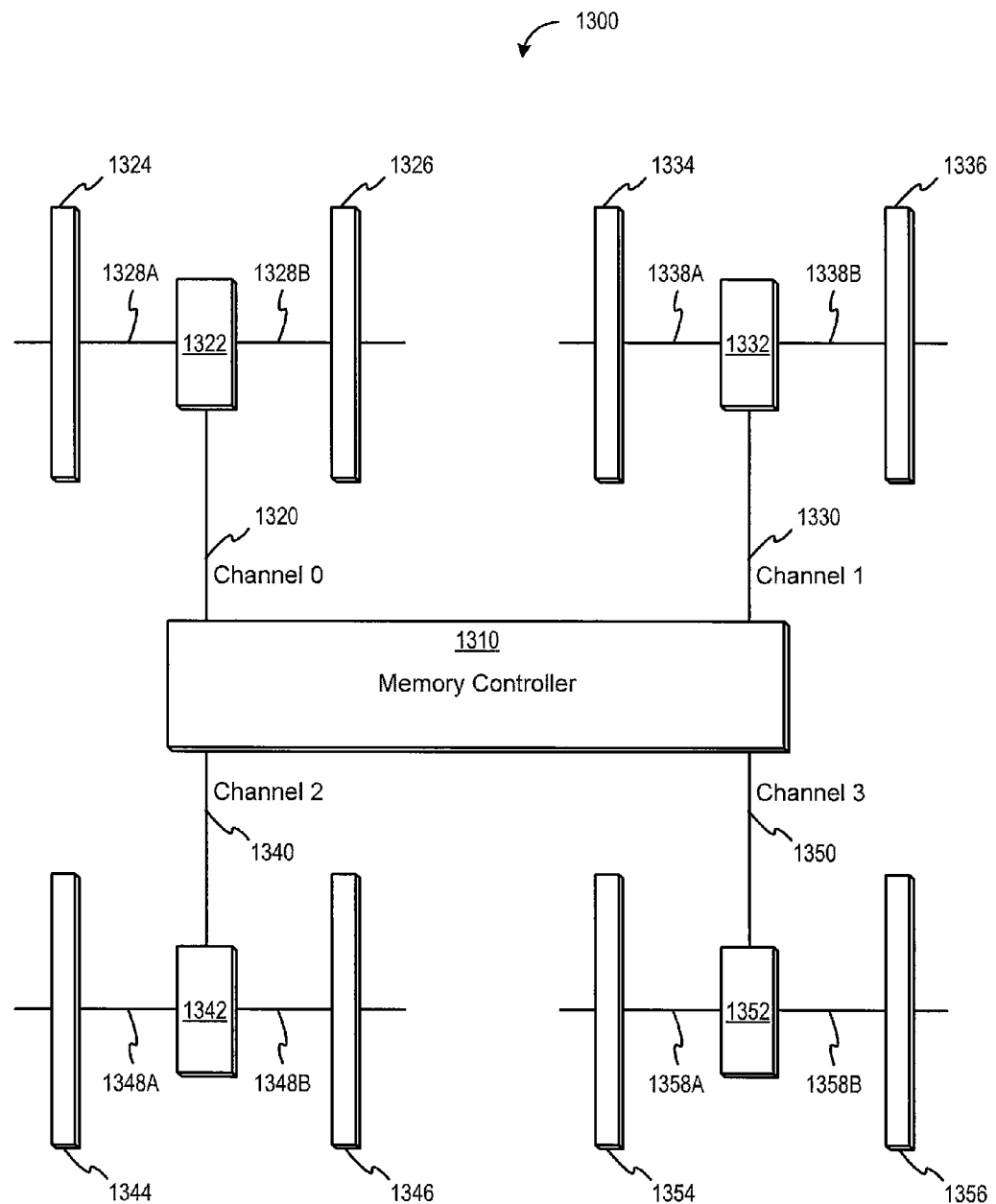
FIG. 13 illustrates a memory subsystem that includes a memory controller with four memory channels, where each channel includes one or more interface circuits and two memory modules per channel, according to still yet another embodiment of the invention.

FIG. 13 illustrates a four channel memory subsystem 1300, according to still yet another embodiment of the present invention. As shown, the memory subsystem 1300 includes a memory controller 1310 and four memory channels 1320, 1330, 1340, and 1350. Furthermore, as illustrated, each memory channel has one interface circuit and supports up to two memory modules. For example, memory channel 1320 has interface circuit 1322 and supports up to two memory modules 1324 and 1326. Similarly, memory channel 1330 has interface circuit 1332 and supports up to two memory modules 1334 and 1336; memory channel 1340 has interface circuit 1342 and supports up to two memory modules 1344 and 1346; and memory channel 1350 has one interface circuit 1352 and supports up to two memory modules 1354 and 1356. It should be noted that the function performed by each of the interface circuits 1322, 1332, 1342, and 1352 may be implemented in one or more integrated circuits.

Interface circuit 1322 has two separate memory buses 1328A and 1328B, each of which connects to a memory module. Similarly, interface circuit 1332 has two separate memory buses 1338A and 1338B, interface circuit 1342 has two separate memory buses 1348A and 1348B, and interface circuit 1352 has two separate memory buses 1358A and 1358B. The memory modules may use either ×4 memory circuits or ×8 memory circuits. As an option, the memory subsystem 1300 including the memory controller 1310 and the interface circuits 1322, 1332, 1342, and 1352 may be implemented in the context of the architecture and environment of FIGS. 6-12. Of course, the memory subsystem 1300 including the memory controller 1310 and the interface circuits 1322, 1332, 1342, and 1352 may be used in any desired environment. It should also be noted that the aforementioned definitions may apply during the present description.

If the memory modules in memory subsystem 1300 are single-rank or dual-rank or quad-rank modules composed of ×8 memory circuits, then interface circuit 1322 may be configured, for example, to provide the memory controller with the ability to alternate between a rank on memory bus 1328A and a rank on memory bus 1328B without inserting any idle bus cycles on memory bus 1320 when the memory controller issues BL4 commands. Interface circuits 1332, 1342, and 1352 (and thus, memory buses 1330, 1340, and 1350 respectively) may be configured in a similar manner.

If the memory modules in memory subsystem 1300 are single-rank modules composed of ×4 memory circuits, then interface circuit 1322 may be configured to emulate two ranks of ×8 memory circuits using a single rank of ×4 memory circuits. This configuration provides the memory controller with the ability to alternate between any of the ranks of memory circuits on memory buses 1328A and 1328B without any idle bus cycles on memory bus 1320 when the memory controller issues BL4 commands. Interface circuits 1332, 1342, and 1352 (and thus, memory buses 1330, 1340, and 1350 respectively) may be configured in a similar manner.

More illustrative information will now be set forth regarding various optional architectures and features of different embodiments with which the foregoing frameworks may or may not be implemented, per the desires of the user. It should be noted that the following information is set forth for illustrative purposes and should not be construed as limiting in any manner. Any of the following features may be optionally incorporated with or without the other features described.

As shown in FIG. 4 and FIG. 5, for a BL8 read or write access, a ×4 memory circuit belonging to a first rank of memory circuits (say on memory module 422) would connect to the memory bus for four clock cycles and respond to the read or write access. The memory controller must ensure one or more idle bus cycles before performing a read or write access to a ×4 memory circuit of a second rank of memory circuits (say on memory module 424). The idle bus cycle(s) provide sufficient time for the ×4 memory circuit of the first rank to disconnect from the bus 420 and for the ×4 memory circuit of the second rank to connect to the bus 420. For example, a ×4 memory circuit of a first rank may receive a BL8 read command from the memory controller during clock cycle $T_0$, and the memory circuit may transmit the requested data during clock cycles $T_n$, $T_{n+1}$, $T_{n+2}$, and $T_{n+3}$, where n is the read column access latency (i.e. read CAS latency) of the memory circuit. The earliest time a ×4 memory circuit of a second rank may receive a BL8 read command from the memory controller is clock cycle $T_5$. In response to this command, the ×4 memory circuit of the second rank will transmit the requested data during clock cycles $T_{n+5}$, $T_{n+6}$, $T_{n+7}$, and $T_{n+8}$. Clock cycle $T_{n+4}$ is an idle data bus cycle during which the ×4 memory circuit of the first rank (say, on module 422) disconnects from the memory bus 420 and the ×4 memory circuit of the second rank (say, on module 424) connects to the memory bus 420. As noted before, this need for idle bus cycles arises when memory circuits belonging to different ranks share a common data bus 420.

In various embodiments of the present invention as illustrated in FIGS. 6-9 and 14, an interface circuit may be configured to emulate a ×4 memory circuit using a ×8 memory circuit. For example, interface circuit 640 may emulate a ×4 memory circuit using a ×8 memory circuit (say, memory circuit 620A). A ×8 memory circuit 620A needs to connect to the memory bus 680 for only two clock cycles in order to respond to a BL8 read or write access to a ×4 memory circuit. Thus, a successive BL8 read or write access to a ×4 memory circuit of a different rank may be scheduled to a ×8 memory circuit of a second rank (say, memory circuit 630A) four clock cycles after the read or write access to a memory circuit 620A of a first rank. For example, in response to a BL8 read command to a ×4 memory circuit of one rank from the memory controller 650, one or more of the interface circuits 640 and 652 may issue a BL4 read command to a ×8 memory circuit 620A of a first rank in clock cycle $T_0$. The memory circuit 620A may transmit the requested data during clock cycles $T_n$ and $T_{n+1}$, where n is the read CAS latency of the memory circuit. Then, the ×8 memory circuit 620A of the first rank will disconnect from the memory bus 680 during clock cycles $T_{n+2}$ and $T_{n+3}$. The interface circuit 640 may capture the data from the ×8 memory circuit 620A of the first rank and re-transmit it to the memory controller 650 on data bus 690 during clock cycles $T_{n+m}$, $T_{n+1+m}$, $T_{n+2+m}$, and $T_{n+3+m}$, where m is the delay or latency introduced by the interface circuit 640. The memory controller 650 may then schedule a BL8 read access to a ×4 memory circuit of a different rank in such a manner that one or more of the interface circuits 640 and 652 issue a BL4 read command to a ×8 memory circuit 630A of a second rank during clock cycle $T_4$. The ×8 memory circuit 630A of the second rank may connect to the memory bus 680 during clock cycle $T_{n+3}$ and optionally $T_{n+2}$, and transmit the requested data to the interface circuit 640 during clock cycles $T_{n+4}$ and $T_{n+5}$. The interface circuit 640 may capture the data from the ×8 memory circuit 630A of the second rank and re-transmit it to the memory controller 650 during clock cycles $T_{n+4+m}$, $T_{n+5+m}$, $T_{n+6+m}$, and $T_{n+7+m}$. Thus, a memory subsystem 600 or 900 may have the capability of switching from a first rank of memory circuits to a second rank of memory circuits without requiring idle bus cycles when using an interface circuit of the present invention and configuring it to emulate a ×4 memory circuit using a ×8 memory circuit.

As shown in FIG. 4 and FIG. 5, for a BL4 read or write access, a ×4 or ×8 memory circuit belonging to a first rank of memory circuits (say on memory module 422) would connect to the memory bus for two clock cycles and respond to the read or write access. The memory controller inserts one or more idle bus cycles before performing a read or write access to a ×4 or ×8 memory circuit of a second rank of memory circuits (say on memory module 424). The idle bus cycle(s) provide sufficient time for the memory circuit of the first rank to disconnect from the bus 420 and for the memory circuit of the second rank to connect to the bus 420. For example, a memory circuit of a first rank may receive a BL4 read command from the memory controller during clock cycle $T_0$, and the memory circuit may transmit the requested data during clock cycles $T_n$ and $T_{n+1}$, where n is the read column access latency (i.e. read CAS latency) of the memory circuit. The earliest time a memory circuit of a second rank may receive a BL4 read command from the memory controller is clock cycle $T_3$. In response to this command, the memory circuit of the second rank will transmit the requested data during clock cycles $T_{n+3}$ and $T_{n+4}$. Clock cycle $T_{n+2}$ is an idle data bus cycle during which the memory circuit of the first rank (say, on module 422) disconnects from the memory bus 420 and the memory circuit of the second rank (say, on module 424) connects to the memory bus 420. As noted before, this need for idle bus cycles arises when memory circuits belonging to different ranks share a common data bus 420.

In various embodiments of the present invention as illustrated in FIGS. 10-14, an interface circuit may be configured to emulate a ×8 memory circuit using a ×4 memory circuit. For example, interface circuit 1040 emulates two ×8 memory circuits using two ×4 memory circuits (say, memory circuits 1020A and 1030A) for BL4 accesses to the ×8 memory circuits. The interface circuit connects to each ×4 memory circuit by means of an independent 4-bit wide data bus, while presenting an 8-bit wide data bus to the memory controller. Since the memory controller issues only BL4 accesses, alternating BL4 read or write access to the memory circuits of two different ranks may be scheduled without any idle bus cycles on the data bus connecting the memory controller to the interface circuit. For example, in response to a BL4 read command to a ×8 memory circuit of one rank from the memory controller 1050, one or more of the interface circuits 1040 and 1052 may issue a BL8 read command to a ×4 memory circuit 1020A of a first rank in clock cycle $T_0$. The memory circuit 1020A may transmit the requested data on data bus 1080A during clock cycles $T_n$, $T_{n+1}$, $T_{n+2}$, and $T_{n+3}$, where n is the read CAS latency of the memory circuit. The interface circuit 1040 may capture the data from the ×4 memory circuit 1020A of the first rank and re-transmit it to the memory controller 1050 on data bus 1090 during clock cycles $T_{n+m}$ and $T_{n+1+m}$, where m is the delay or latency introduced by the interface circuit 1040. The memory controller 1050 may then schedule a BL4 read access to a ×8 memory circuit of a different rank in such a manner that one or more of the interface circuits 1040 and 1052 issue a BL8 read command to a ×4 memory circuit 1030A of a second rank during clock cycle $T_2$. The ×4 memory circuit 1030A of the second rank may transmit the requested data on data bus 1080B to the interface circuit 1040 during clock cycles $T_{n+2}$, $T_{n+3}$, $T_{n+4}$, and $T_{n+5}$. The interface circuit 1040 may capture the data from the ×4 memory circuit 1030A of the second rank and re-transmit it to the memory controller 650 during clock cycles $T_{n+2+m}$ and $T_{n+3+m}$. Thus, a memory subsystem 1000 or 1300 may have the capability of alternating BL4 accesses between a first rank of memory circuits and a second rank of memory circuits without requiring idle bus cycles when using an interface circuit of the present invention and configuring it to emulate a ×8 memory circuit using a ×4 memory circuit.

In various memory subsystems (e.g. 300, 600, 900, 1000, 1300, etc.), the memory controller (e.g. 340, 650, 910, 1050, 1310, etc.) may read the contents of a non-volatile memory circuit (e.g. 334, 654, 1054, etc.), typically an EEPROM, that contains information about the configuration and capabilities of memory module (e.g. 310, 610, 924A, 924B, 1010, 1324, 1326, etc.). The memory controller may then configure itself to interoperate with the memory module(s). For example, memory controller 300 may read the contents of the non-volatile memory circuit 334 that contains information about the configuration and capabilities of memory module 310. The memory controller 300 may then configure itself to interoperate with memory module 310. Additionally, the memory controller 300 may send configuration commands to the memory circuits 320A-J and then, start normal operation. The configuration commands sent to the memory circuits typically set the speed of operation and the latencies of the memory circuits, among other things. The actual organization of the memory module may not be changed by the memory controller in prior art memory subsystems (e.g. 100, 200, and 300). For example, if the memory circuits 320A-J are 1 Gb×4 DDR3 SDRAMs, certain aspects of the memory module (e.g. number of memory circuits per rank, number of ranks, number of rows per memory circuit, number of columns per memory circuit, width of each memory circuit, rank-rank turnaround times) are all fixed parameters and cannot be changed by the memory controller 340 or by any other interface circuit (e.g. 330) on the memory module.

In another embodiment of the present invention, a memory module and/or a memory subsystem (e.g. 600, 900, 1000, 1300, etc.) may be constructed such that the user has the ability to change certain aspects (e.g. number of memory circuits per rank, number of ranks, number of rows per memory circuit, number of columns per memory circuit, width of each memory circuit, rank-rank turnaround times) of the memory module. For example, the user may select between higher memory reliability and lower memory power. To illustrate, at boot time, memory controller 650 may read the contents of a non-volatile memory circuit 654 (e.g. EEPROM) that contains information about the configuration and capabilities of memory module 610. The memory controller may then change the configuration and capabilities of memory module 610 based on user input or user action. The re-configuration of memory module 610 may be done in many ways. For example, memory controller 650 may send special re-configuration commands to one or more of the interface circuits 640 and 652. Alternately, memory controller 650 may overwrite the contents of non-volatile memory circuit 654 to reflect the desired configuration of memory module 610 and then direct one or more of the interface circuits 640 and 652, to read the contents of non-volatile memory circuit 654 and re-configure themselves. As an example, the default mode of operation of memory module 610 may be a module with ×4 memory circuits. In other words, interface circuit 640 uses ×8 memory circuits to emulate ×4 memory circuits. As noted previously, this enables Chipkill and thus provides higher memory reliability. However, the user may desire lower memory power instead. So, at boot time, memory controller 650 may check a software file or setting that reflects the user's preferences and re-configure memory module 610 to operate as a module with ×8 memory circuits. In this case, certain other configuration parameters or aspects pertaining to memory module 610 may also change. For example, when there are thirty six ×8 memory circuits on memory module 610, and when the module is operated as a module with ×8 memory circuits, the number of ranks on the module may change from two to four.

In yet another embodiment of the present invention, one or more of the interface circuits (e.g. 640, 652, 922, 1040, 1052, 1322, etc.) may have the capability to also emulate higher capacity memory circuits using a plurality of lower capacity memory circuits. The higher capacity memory circuit may be emulated to have a different organization than that of the plurality of lower capacity memory circuits, wherein the organization may include a number of banks, a number of rows, a number of columns, or a number of bits per column. Specifically, the emulated memory circuit may have the same or different number of banks than that associated with the plurality of memory circuits; same or different number of rows than that associated with the plurality of memory circuits; same or different number of columns than that associated with the plurality of memory circuits; same or different number of bits per column than that associated with the plurality of memory circuits; or any combination thereof. For example, one or more of the interface circuits 640 and 652 may emulate a higher capacity memory circuits by combining the two memory circuits. To illustrate, say that all the memory circuits on memory module 610 are 1 Gb×8 DRAMs. As shown in FIG. 6, the module 610 may be operated as a dual-rank 4 GB DIMM composed of 1 Gb×4 DRAMs. That is, the interface circuits 640 and 652 emulate a 1 Gb×4 DRAM that has a different number of bits per column than the plurality of 1 Gb×8 DRAMs on the module. However, one or more of the interface circuits 640 and 652 may be configured such that memory module 610 now emulates a single-rank 4 GB DIMM composed of 2 Gb×4 DRAMs to memory controller 650. In other words, one or more of the interface circuits 640 and 652 may combine memory circuits 620A and 630A and emulate a 2 Gb×4 DRAM. The 2 Gb×4 DRAM may be emulated to have twice the number of rows but the same number of columns as the plurality of 1 Gb×8 DRAMs on the module. Alternately, the 2 Gb×4 DRAM may be emulated to have the same number of rows but twice the number of columns as the plurality of 1 Gb×8 DRAMs on the module. In another implementation, the 2 Gb×4 DRAM may be emulated to have twice the number of banks but the same number of rows and columns as the plurality of 1 Gb×8 DRAMs on the module. In yet another implementation, the 2 Gb×4 DRAM may be emulated to have four times the number of banks as the plurality of 1 Gb×8 DRAMs but have half the number of rows or half the number of columns as the 1 Gb×8 DRAMs. Of course, the 2 Gb DRAM may be emulated as having any other combination of number of banks, number of rows, number of columns, and number of bits per column.

Figure 14A:
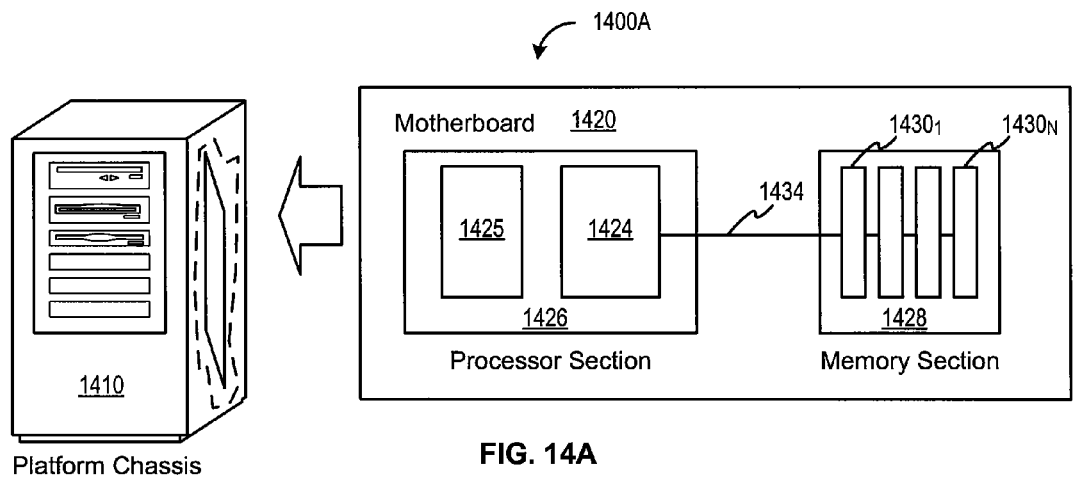
FIGS. 14A-14F illustrate various configurations of memory sections, processor sections, and interface circuits, according to various embodiments of the invention.

FIG. 14A illustrates a computer platform (i.e., a computer system) 1400A that includes a platform chassis 1410, and at least one processing element that consists of or contains one or more boards, including at least one motherboard 1420. Of course the platform 1400A as shown might comprise a single case and a single power supply and a single motherboard. However, it might also be implemented in other combinations where a single enclosure hosts a plurality of power supplies and a plurality of motherboards or blades.

The motherboard 1420 in turn might be organized into several partitions, including one or more processor sections 1426 consisting of one or more processors 1425 and one or more memory controllers 1424, and one or more memory sections 1428. Of course, as is known in the art, the notion of any of the aforementioned sections is purely a logical partitioning, and the physical devices corresponding to any logical function or group of logical functions might be implemented fully within a single logical boundary, or one or more physical devices for implementing a particular logical function might span one or more logical partitions. For example, the function of the memory controller 1424 might be implemented in one or more of the physical devices associated with the processor section 1426, or it might be implemented in one or more of the physical devices associated with the memory section 1428.

Figure 14B:
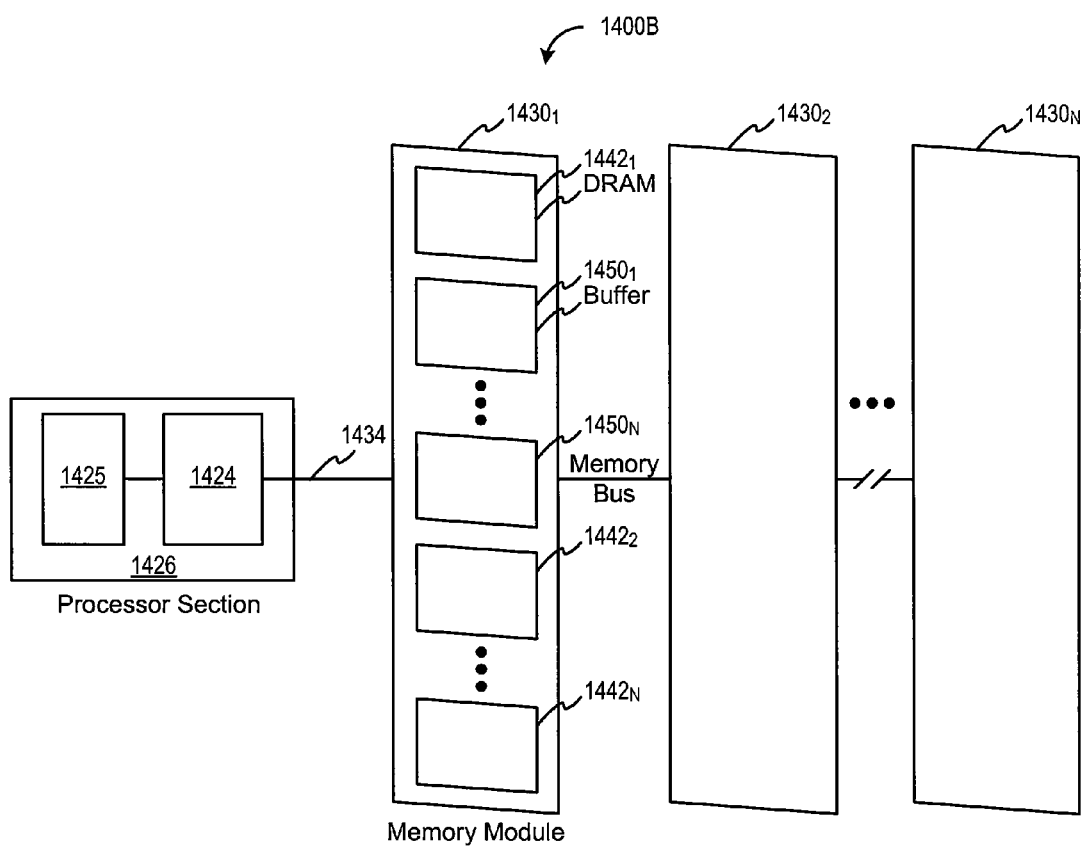
Figures 14C, 14D:
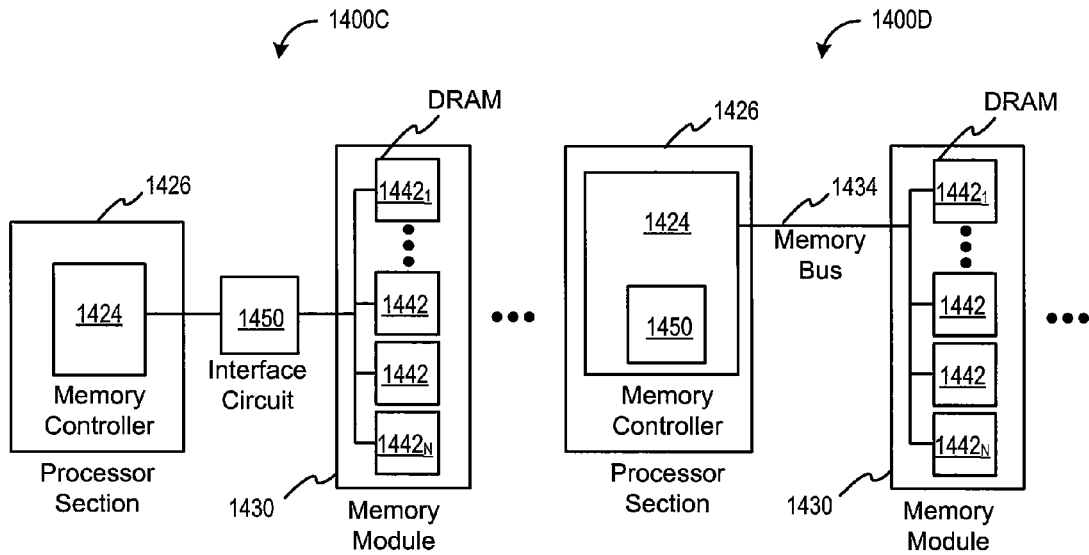

FIG. 14B illustrates one exemplary embodiment of a memory section, such as, for example, the memory section 1428, in communication with a processor section 1426 over one or more busses, possibly including bus 1434. In particular, FIG. 14B depicts embodiments of the invention as is possible in the context of the various physical partitions on structure 1420. As shown, one or more memory modules $1430_1$, $1430_2$-$1430_N$ each contain one or more interface circuits $1450_1$-$1450_N$ and one or more DRAMs $1442_1$, $1442_2$-$1442_N$ positioned on (or within) a memory module $1430_1$.

It must be emphasized that although the memory is labeled variously in the figures (e.g. memory, memory components, DRAM, etc), the memory may take any form including, but not limited to, DRAM, synchronous DRAM (SDRAM), double data rate synchronous DRAM (DDR SDRAM, DDR2 SDRAM, DDR3 SDRAM, etc.), graphics double data rate synchronous DRAM (GDDR SDRAM, GDDR2 SDRAM, GDDR3 SDRAM, etc.), quad data rate DRAM (QDR DRAM), RAMBUS XDR DRAM (XDR DRAM), fast page mode DRAM (FPM DRAM), video DRAM (VDRAM), extended data out DRAM (EDO DRAM), burst EDO RAM (BEDO DRAM), multibank DRAM (MDRAM), synchronous graphics RAM (SGRAM), phase-change memory, flash memory, and/or any other type of volatile or non-volatile memory.

Figures 14E, 14F:
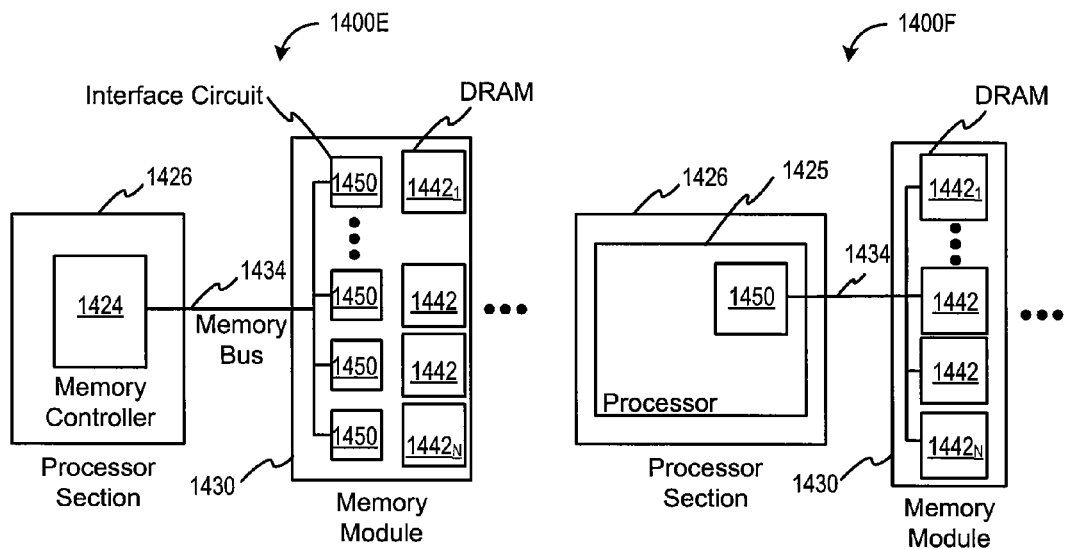

Many other partition boundaries are possible and contemplated, including, without limitation, positioning one or more interface circuits 1450 between a processor section 1426 and a memory module 1430 (see FIG. 14C), or implementing the function of the one or more interface circuits 1450 within the memory controller 1424 (see FIG. 14D), or positioning one or more interface circuits 1450 in a one-to-one relationship with the DRAMs $1442_1$-$1442_N$ and a memory module 1430 (see 14E), or implementing the one or more interface circuits 1450 within a processor section 1426 or even within a processor 1425 (see FIG. 14F).

Furthermore, the systems illustrated in FIGS. 6-13 are analogous to the computer platform 1400A and 1410 illustrated in FIGS. 14A-14F. Therefore, all discussions of FIGS. 6-13 apply with equal force to the systems illustrated in FIGS. 14A-14F.

While the foregoing is directed to embodiments of the present invention, other and further embodiments of the invention may be devised without departing from the basic scope thereof. Therefore, the scope of the present invention is determined by the claims that follow.

What is claimed:
1. A memory module comprising:
   a first rank of memory circuits comprising a first memory circuit;
   a second rank of memory circuits comprising a second memory circuit;
   an interface circuit;

a first data bus that connects to the first memory circuit, the second memory circuit, and the interface circuit, the first data bus having a first data bus width; and a second data bus that connects to the interface circuit and a memory controller, the second data bus having a second data bus width, wherein the second data bus width is half of the first data bus width;

wherein the interface circuit is operable to:
receive a read command from the memory controller to read data that is stored in the memory module, wherein the data associated with the read command includes first data stored in the first memory circuit and second data stored in the second memory circuit;
enable a chip select pin of the first memory circuit to connect the first memory circuit to the first data bus;
read the first data from the first memory circuit across the first data bus;
transmit the first data to the memory controller across the second data bus;
insert idle clock cycles, and during the idle clock cycles:
(i) disable the chip select pin of the first memory circuit to disconnect the first memory circuit from the first data bus, and
(ii) enable a chip select pin of the second memory circuit to connect the second memory circuit to the first data bus, while the first data is being transmitted to the memory controller across the second data bus;
read the second data from the second memory circuit across the first data bus; and
transmit the second data to the memory controller across the second data bus without a delay on the second data bus between the first data and the second data.

2. The memory module of claim 1, wherein the interface circuit is further operable to:
receive a write command from the memory controller to write data to the memory module, wherein the data associated with the write command include first write data to be written to the first memory circuit and second write data to be written to the second memory circuit;
receive the first write data across the second data bus from the memory controller;
receive the second write data across the second data bus from the memory controller, wherein the first write data and the second write data are received by the interface circuit without a delay on the second data bus between the first write data and the second write data;
enable the chip select pin of the first memory circuit to connect the first memory circuit to the first data bus;
transmit the first write data to the first memory circuit across the first data bus;
insert idle clock cycles, and during the idle clock cycles:
(i) disable the chip select pin of the first memory circuit to disconnect the first memory circuit from the first data bus, and
(ii) enable the chip select pin of the second memory circuit to connect the second memory circuit to the first data bus; and
transmit the second write data to the second memory circuit across the first data bus.

3. The memory module of claim 1, wherein the interface circuit is further operable to insert idle clock cycles in a burst chop mode.

4. The memory module of claim 1, wherein the memory circuits in the first rank and the second rank are ×8 memory circuits, and wherein the interface circuit is further operable to present the memory module to the memory controller as a memory module with ×4 memory circuits.

5. The memory module of claim 1, wherein the memory circuits in the first rank and the second rank are dynamic random access memory (DRAM) circuits.

6. The memory module of claim 1, further comprising:
a non-volatile memory circuit that stores configuration and capabilities of the memory module to be presented to the memory controller, wherein the interface circuit is further operable to modify the configuration and capabilities stored on the non-volatile memory circuit.

7. A memory module comprising:
a first rank of memory circuits comprising a first memory circuit;
a second rank of memory circuits comprising a second memory circuit;
an interface circuit;
a first data bus that connects to the first memory circuit and the interface circuit, the first data bus having a first data bus width;
a second data bus that connects to the second memory circuit and the interface circuit, the second data bus having the first data bus width; and
a third data bus that connects to a memory controller and the interface circuit, the third data bus having a second data bus width, wherein the second data bus width is twice of the first data bus width;
wherein the interface circuit is operable to:
receive a read command from the memory controller to read data that is stored in the memory module, wherein the data associated with the read command includes first data stored in the first memory circuit and second data stored in the second memory circuit;
read the first data from the first memory circuit across the first data bus;
transmit the first data to the memory controller across the third data bus;
while the first data is being transmitted to the memory controller across the third data bus, read the second data from the second memory circuit across the second data bus; and
transmit the second data to the memory controller across the third data bus without a delay on the third data bus between the first data and the second data.

8. The memory module of claim 7, wherein the interface circuit is further configured to:
receive a write command from the memory controller to write data to the memory module, wherein the data associated with the write command include first write data to be written to the first memory circuit and second write data to be written to the second memory circuit;
receive the first write data across the third data bus from the memory controller;
transmit the first write data to the first memory circuit across the first data bus;
while the first write data is being transmitted to the first memory circuit across the first data bus, receive the second write data across the third data bus from the memory controller, wherein the first write data and the second write data are received by the interface circuit without a delay on the third data bus; and
transmit the second write data to the second memory circuit across the second data bus.

9. The memory module of claim 7, wherein the memory circuits in the first rank and the second rank are ×4 memory circuits, and wherein the interface circuit is further operable to present the memory module to the memory controller as a memory module with ×8 memory circuits.

10. The memory module of claim 7, wherein the memory circuits in the first rank and the second rank are dynamic random access memory (DRAM) circuits.

11. The memory module of claim 7, further comprising:
a non-volatile memory circuit that stores configuration and capabilities of the memory module to be presented to the memory controller, wherein the interface circuit is further operable to modify the configuration and capabilities stored on the non-volatile memory circuit.

12. A memory subsystem comprising:
an interface circuit;
a first memory module comprising:
    a first rank of memory circuits comprising a first memory circuit;
a second memory module comprising:
    a second rank of memory circuits comprising a second memory circuit;
a first data bus that connects to the first memory circuit, the second memory circuit, and the interface circuit, the first data bus having a first data bus width; and
a second data bus that connects to the interface circuit and a memory controller, the second data bus having a second data bus width, wherein the second data bus width is half of the first data bus width;
wherein the interface circuit is operable to:
    receive a first read command from the memory controller to read data that is stored in the memory subsystem, wherein the data associated with the first read command includes first data stored in the first memory circuit and second data stored in the second memory circuit;
    enable a chip select pin of the first memory circuit to connect the first memory circuit to the first data bus;
    read the first data from the first memory circuit across the first data bus;
    transmit the first data to the memory controller across the second data bus;
    insert idle clock cycles, and during the idle clock cycles:
        (i) disable the chip select pin of the first memory circuit to disconnect the first memory circuit from the first data bus, and
        (ii) enable a chip select pin of the second memory circuit to connect the second memory circuit to the first data bus, while the first data is being transmitted to the memory controller across the second data bus;
    read the second data from the second memory circuit across the first data bus; and
    transmit the second data to the memory controller across the second data bus without a delay on the second data bus between the first data and the second data.

13. The memory subsystem of claim 12, wherein the interface circuit is further operable to:
receive a first write command from the memory controller to write data to the memory subsystem, wherein the data associated with the first write command include first write data to be written to the first memory circuit and second write data to be written to the second memory circuit;
receive the first write data across the second data bus from the memory controller;
receive the second write data across the second data bus from the memory controller, wherein the first write data and the second write data are received by the interface circuit without a delay on the second data bus between the first write data and the second write data;
enable the chip select pin of the first memory circuit to connect the first memory circuit to the first data bus;
transmit the first write data to the first memory circuit across the first data bus;
insert idle clock cycles, and during the idle clock cycles:
    (i) disable the chip select pin of the first memory circuit to disconnect the first memory circuit from the first data bus, and
    (ii) enable the chip select pin of the second memory circuit to connect the second memory circuit to the first data bus; and
transmit the second write data to the second memory circuit across the first data bus.

14. The memory subsystem of claim 12, further comprising:
a third memory module comprising:
    a third rank of memory circuits comprising a third memory circuit;
a third data bus that connects to the third memory circuit and the interface circuit, the third data bus having the first data bus width; and
wherein the interface circuit is further operable to:
    receive a second read command from the memory controller to read data that is stored in the memory subsystem, wherein the data associated with the second read command includes third data stored in the first memory circuit and fourth data stored in the third memory circuit;
    read the third data from the first memory circuit across the first data bus;
    transmit the third data to the memory controller across the second data bus;
    read the fourth data from the third memory circuit across the third data bus without inserting idle clock cycles; and
    transmit the fourth data to the memory controller across the second data bus without a delay on the second data bus between the third data and the fourth data.

15. The memory subsystem of claim 14, wherein the interface circuit is further operable to:
receive a second write command from the memory controller to write data to the memory subsystem, wherein the data associated with the second write command include third write data to be written to the first memory circuit and fourth write data to be written to the third memory circuit;
receive the third write data across the second data bus from the memory controller;
transmit the third write data to the first memory circuit across the first data bus;
while the third write data is being transmitted to the first memory circuit across the first data bus, receive the fourth write data across the second data bus from the memory controller, wherein the third write data and the fourth write data are received by the interface circuit without a delay on the second data bus; and
transmit the fourth write data to the third memory circuit across the third data bus.

16. The memory subsystem of claim 12, wherein:
the first memory module further comprises:
    a fourth rank of memory circuits comprising a fourth memory circuit;
the first data bus connects to the first memory circuit, the second memory circuit, the fourth memory circuit, and the interface circuit;

wherein the interface circuit is further operable to:
receive a third read command from the memory controller to read data that is stored in the memory subsystem, wherein the data associated with the third read command includes fifth data stored in the first memory circuit and sixth data stored in the fourth memory circuit;
enable the chip select pin of the first memory circuit to connect the first memory circuit to the first data bus;
read the fifth data from the first memory circuit across the first data bus;
transmit the fifth data to the memory controller across the second data bus;
insert idle clock cycles, and during the idle clock cycles:
(i) disable the chip select pin of the first memory circuit to disconnect the first memory circuit from the first data bus, and
(ii) enable a chip select pin of the fourth memory circuit to connect the fourth memory circuit to the first data bus, while the fifth data is being transmitted to the memory controller across the second data bus;
read the sixth data from the fourth memory circuit across the first data bus; and
transmit the sixth data to the memory controller across the second data bus without a delay on the second data bus between the fifth data and the sixth data.

17. The memory subsystem of claim 16, wherein the interface circuit is further operable to:
receive a third write command from the memory controller to write data to the memory subsystem, wherein the data associated with the third write command include fifth write data to be written to the first memory circuit and sixth write data to be written to the fourth memory circuit;
receive the fifth write data across the second data bus from the memory controller;
receive the sixth write data across the second data bus from the memory controller, wherein the fifth write data and the sixth write data are received by the interface circuit without a delay on the second data bus between the fifth write data and the sixth write data;
enable the chip select pin of the first memory circuit to connect the first memory circuit to the first data bus;
transmit the fifth write data to the first memory circuit across the first data bus;
insert idle clock cycles, and during the idle clock cycles:
(i) disable the chip select pin of the first memory circuit to disconnect the first memory circuit from the first data bus, and
(ii) enable the chip select pin of the fourth memory circuit to connect the fourth memory circuit to the first data bus; and
transmit the sixth write data to the fourth memory circuit across the first data bus.

18. The memory subsystem of claim 12, wherein the memory circuits in the first rank and the second rank are ×8 memory circuits, and wherein the interface circuit is further operable to present the first memory module and the second memory module to the memory controller as memory modules with ×4 memory circuits.

19. The memory subsystem of claim 12, wherein the memory circuits in the first rank and the second rank are dynamic random access memory (DRAM) circuits.

20. The memory subsystem of claim 12, further comprising:
a non-volatile memory circuit that stores configuration and capabilities of the memory subsystem to be presented to the memory controller, wherein the interface circuit is further operable to modify the configuration and capabilities stored on the non-volatile memory circuit.

21. A system comprising:
a memory controller;
an interface circuit;
a first data bus having a first data bus width;
a second data bus having a second data bus width, wherein the second data bus width is half of the first data bus width; and
a memory module comprising:
a first rank of memory circuits comprising a first memory circuit; and
a second rank of memory circuits comprising a second memory circuit;
wherein the first data bus connects to the first memory circuit, the second memory circuit, and the interface circuit;
wherein the second data bus connects to the interface circuit and the memory controller; and
wherein the interface circuit is operable to:
receive a read command from the memory controller to read data that is stored in the memory module, wherein the data associated with the read command includes first data stored in the first memory circuit and second data stored in the second memory circuit;
enable a chip select pin of the first memory circuit to connect the first memory circuit to the first data bus;
read the first data from the first memory circuit across the first data bus;
transmit the first data to the memory controller across the second data bus;
insert idle clock cycles, and during the idle clock cycles:
(i) disable the chip select pin of the first memory circuit to disconnect the first memory circuit from the first data bus, and
(ii) enable a chip select pin of the second memory circuit to connect to the second memory circuit to the first data bus, while the first data is being transmitted to the memory controller across the second data bus;
read the second data from the second memory circuit across the first data bus; and
transmit the second data to the memory controller across the second data bus without a delay on the second data bus between the first data and the second data.

22. The system of claim 21, wherein the memory circuits in the first rank and the second rank are ×8 memory circuits, and wherein the interface circuit is further operable to present the memory module to the memory controller as a memory module with ×4 memory circuits.

23. The system of claim 21, wherein the memory circuits in the first rank and the second rank are dynamic random access memory (DRAM) circuits.

24. The system of claim 21, further comprising:
a non-volatile memory circuit that stores configuration and capabilities of the memory module to be presented to the memory controller, wherein the interface circuit is further operable to modify the configuration and capabilities stored on the non-volatile memory circuit.

* * * * *